United States Patent
Fetcenko et al.

(10) Patent No.: US 7,211,541 B2
(45) Date of Patent: May 1, 2007

(54) MG—NI HYDROGEN STORAGE COMPOSITE HAVING HIGH STORAGE CAPACITY AND EXCELLENT ROOM TEMPERATURE KINETICS

(75) Inventors: Michael A. Fetcenko, Rochester, MI (US); Kwo Young, Troy, MI (US); Taihei Ouchi, Rochester, MI (US); Melanie Reinhout, Shelby Township, MI (US); Stanford R. Ovshinsky, Bloomfield Hills, MI (US)

(73) Assignee: Ovonic Hydrogen Systems LLC, Rochester Hills, MI (US)

( * ) Notice: Subject to any disclaimer, the term of this patent is extended or adjusted under 35 U.S.C. 154(b) by 87 days.

(21) Appl. No.: 10/733,702

(22) Filed: Dec. 11, 2003

(65) Prior Publication Data
US 2005/0129566 A1 Jun. 16, 2005

(51) Int. Cl.
*B01J 23/58* (2006.01)
*B01J 23/42* (2006.01)
*B01J 23/40* (2006.01)
*B01J 23/00* (2006.01)
*H01M 4/58* (2006.01)

(52) U.S. Cl. ............... 502/328; 502/326; 502/327; 502/335; 502/337; 429/218.2; 429/223

(58) Field of Classification Search ........... 502/326, 502/328, 330, 337, 338, 339, 335, 327; 429/218.2, 429/221, 223
See application file for complete search history.

(56) References Cited

U.S. PATENT DOCUMENTS

| | | | | |
|---|---|---|---|---|
| 4,948,423 A | * | 8/1990 | Fetcenko et al. | 75/10.14 |
| 5,506,069 A | * | 4/1996 | Ovshinsky et al. | 429/59 |
| 5,554,456 A | * | 9/1996 | Ovshinsky et al. | 429/59 |
| 5,616,432 A | * | 4/1997 | Ovshinsky et al. | 429/59 |
| 5,853,919 A | * | 12/1998 | Kohno et al. | 429/223 |
| 5,976,276 A | * | 11/1999 | Sapru et al. | 148/403 |
| 6,040,087 A | * | 3/2000 | Kawakami | 429/218.1 |
| 6,103,024 A | * | 8/2000 | Sapru et al. | 148/403 |
| 6,177,213 B1 | * | 1/2001 | Fetcenko et al. | 429/218.1 |
| 6,207,104 B1 | * | 3/2001 | Kadir et al. | 420/416 |
| 6,328,821 B1 | * | 12/2001 | Ovshinsky et al. | 148/420 |
| 6,329,101 B1 | * | 12/2001 | Kawakami | 429/218.2 |
| 6,447,953 B1 | * | 9/2002 | Fierro et al. | 429/223 |
| 6,491,866 B1 | * | 12/2002 | Ovshinsky et al. | 420/402 |
| 6,627,340 B1 | * | 9/2003 | Ovshinsky et al. | 429/20 |
| 6,830,725 B2 | * | 12/2004 | Fetcenko et al. | 420/580 |
| 7,045,484 B2 | * | 5/2006 | Fetcenko et al. | 502/300 |
| 2004/0219053 A1 | * | 11/2004 | Fetcenko et al. | 420/455 |
| 2005/0051244 A1 | * | 3/2005 | Fetcenko et al. | 148/442 |
| 2005/0126663 A1 | * | 6/2005 | Fetcenko et al. | 148/420 |
| 2005/0170946 A1 | * | 8/2005 | Ovshinsky et al. | 502/60 |

* cited by examiner

*Primary Examiner*—Cam N. Nguyen
(74) *Attorney, Agent, or Firm*—David W. Schumaker; Marvin S. Siskind

(57) ABSTRACT

A hydrogen storage composite material having a Mg—Ni based alloy with a coating of a catalytically active metal deposited on at least a portion of a surface of said Mg—Ni based alloy. The coating is less than about 200 angstroms thick and preferably is formed from iron or palladium. The composite material is capable of adsorbing at least 3 weight percent hydrogen and desorbing at least 1 weight percent hydrogen at 30° C. The Mg—Ni based alloy has a microstructure including both a Mg-rich phase and a Ni-rich phase, micro-tubes having an inner core of Ni-rich material surrounded by a sheathing of Mg-rich material, amorphous structural regions and microcrystalline structural regions.

14 Claims, 24 Drawing Sheets

XRD from MS+MA AR3 powder showing amorphous + microcrystalline MgNi

XRD from MS ribbon before MA showing $Mg_2Ni$, $Mg(Ni,Co)_2$ polycrystals.

MG—NI HYDROGEN STORAGE COMPOSITE HAVING HIGH STORAGE CAPACITY AND EXCELLENT ROOM TEMPERATURE KINETICS

FILED OF THE INVENTION

The instant invention relates generally to hydrogen storage materials and more specifically to a new composite hydrogen storage material having heretofore unheard of properties. Specifically the instant hydrogen storage material provides for a storage capacity of up to 4.86 weight percent hydrogen with a high adsorption rate at temperatures as low as 30° C. and an absorption pressure of less than about 150 PSI. The composite materials are light weight and absorb at least 3 weight percent in less than two minutes at 30° C. More remarkably, the composite materials also have the ability to fully desorb the stored hydrogen at temperatures as low as 250° C., an ability not heretofore seen in materials with such a high total storage capacity. Even more amazingly the same material can desorb 2.51 weight percent of the stored hydrogen at 90° C. and 1.2 weight percent at 30° C. In addition these material are relatively inexpensive and easy to produce.

BACKGROUND OF THE INVENTION

Growing energy needs have prompted specialists to take cognizance of the fact that the traditional energy resources, such as coal, petroleum or natural gas, are not inexhaustible, or at least that they are becoming costlier all the time, and that it is advisable to consider replacing them with hydrogen.

Hydrogen may be used, for example, as fuel for internal-combustion engines in place of hydrocarbons. In this case it has the advantage of eliminating atmospheric pollution through the formation of oxides of carbon, nitrogen and sulfur upon combustion of the hydrocarbons. Hydrogen may also be used to fuel hydrogen-air fuel cells for production of the electricity needed for electric motors.

One of the problems posed by the use of hydrogen is its storage and transportation. A number of solutions have been proposed:

Hydrogen may be stored under high pressure in steel cylinders, but this approach has the drawback of requiring hazardous and heavy containers which are difficult to handle (in addition to having a low storage capacity of about 1% by weight). Hydrogen may also be stored in cryogenic containers, but this entails the disadvantages associated with the use of cryogenic liquids; such as, for example, the high cost of the containers, which also require careful handling. There are also "boil off" losses of about 2–5% per day.

Another method of storing hydrogen is to store it in the form of a hydride, which then is decomposed at the proper time to furnish hydrogen. The hydrides of iron-titanium, lanthanum-nickel, vanadium, and magnesium have been used in this manner, as described in French Pat. No. 1,529, 371.

Since the initial discovery that hydrogen could be stored in a safe, compact solid state metal hydride form, researchers have been trying to produce hydrogens storage materials which have optimal properties. Generally, the ideal material properties that these researchers have been attempting to achieve are: 1) a high hydrogen storage capacity; 2) light weight materials; 3) adequate hydrogen absorption/desorption temperatures; 4) adequate absorption/desorption pressures; 5) fast absorption kinetics; and 6) a long absorption/desorption cycle life. In addition to these material properties, ideal materials would be inexpensive and easy to produce.

The $MgH_2$—Mg system is the most appropriate of all known metal-hydride and metal systems that can be used as reversible hydrogen-storage systems because it has the highest percentage by weight (7.65% by weight) of theoretical capacity for hydrogen storage and hence the highest theoretical energy density (2332 Wh/kg; Reilly & Sandrock, Spektrum der Wissenschaft, April 1980, 53) per unit weight of storage material.

Although this property and the relatively low price of magnesium make the $MgH_2$—Mg seem the optimum hydrogen storage system for transportation, for hydrogen-powered vehicles that is, its unsatisfactory kinetics have prevented it from being used up to the present time. It is known for instance that pure magnesium can be hydrided only under drastic conditions, and then only very slowly and incompletely. The dehydriding rate of the resulting hydride is also unacceptable for a hydrogen storage material (Genossar & Rudman, Z. f. Phys. Chem., Neue Folge 116, 215 [1979], and the literature cited therein).

Moreover, the hydrogen storage capacity of a magnesium reserve diminishes during the charging/discharging cycles. This phenomenon may be explained by a progressive poisoning of the surface, which during charging renders the magnesium atoms located in the interior of the reserve inaccessible to the hydrogen.

To expel the hydrogen in conventional magnesium or magnesium/nickel reserve systems, temperatures of more than 250° C. are required, with a large supply of energy at the same time. The high temperature level and the high energy requirement for expelling the hydrogen have the effect that, for example, a motor vehicle with an internal combustion engine, cannot exclusively be operated from these alloys. This occurs because the energy contained in the exhaust gas, in the most favorable case (full load), is sufficient for meeting only 50% of the hydrogen requirement of the internal combustion engine from a magnesium or magnesium/nickel alloy. Thus, the remaining hydrogen demand must be taken from another hydride alloy. For example, this alloy can be titanium/iron hydride (a typical low-temperature hydride store) which can be operated at temperatures down to below 0° C. These low-temperature hydride alloys have the disadvantage of having a low hydrogen storage capacity.

Storage materials have been developed in the past, which have a relatively high storage capacity but from which hydrogen is nevertheless expelled at temperatures of up to about 250° C. U.S. Pat. No. 4,160,014 describes a hydrogen storage material of the formula $Ti_{[1-x]}Zr_{[x]}Mn_{[2-y-z]}Cr_{[y]}V_{[z]}$, wherein x=0.05 to 0.4, y=0 to 1 and z=0 to 0.4. Up to about 2% by weight of hydrogen can be stored in such an alloy. In addition to this relatively low storage capacity, these alloys also have the disadvantage that the price of the alloy is very high when metallic vanadium is used.

Moreover, U.S. Pat. No. 4,111,689 has disclosed a storage alloy which comprises 31 to 46% by weight of titanium, 5 to 33% by weight of vanadium and 36 to 53% by weight of iron and/or manganese. Although alloys of this type have a greater storage capacity for hydrogen than the alloy according to U.S. Pat. No. 4,160,014, hereby incorporated by reference, they have the disadvantage that temperatures of at least 250° C. are necessary in order to completely expel the hydrogen. At temperatures of up to about 100° C., about 80% of the hydrogen content can be discharged in the best case. However, a high discharge capacity, particularly at low temperatures, is frequently necessary in industry because the heat required for liberating the hydrogen from the hydride stores is often available only at a low temperature level.

In contrast to other metals or metal alloys, especially such metal alloys which contain titanium or lanthanum, magnesium is preferred for the storage of hydrogen not only because of its lower material costs, but above all, because of its lower specific weight as a storage material. However, the hydriding

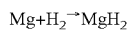

is, in general, more difficult to achieve with magnesium, inasmuch as the surface of the magnesium will rapidly oxidize in air so as to form stable MgO and/or $Mg(OH)_2$ surface layers. These layers inhibit the dissociation of hydrogen molecules, as well as the absorption of produced hydrogen atoms and their diffusion from the surface of the granulate particles into the magnesium storage mass.

Intensive efforts have been devoted in recent years to improve the hydriding ability of magnesium by doping or alloying it with such individual foreign metals as aluminum (Douglass, Metall. Trans. 6a, 2179 [1975]) indium (Mintz, Gavra, & Hadari, J. Inorg. Nucl. Chem. 40, 765 [1978]), or iron (Welter & Rudman, Scripta Metallurgica 16, 285 [1982]), with various foreign metals (German Offenlegungsschriften 2 846 672 and 2 846 673), or with intermetallic compounds like $Mg_2Ni$ or $Mg_2Cu$ (Wiswall, Top Appl. Phys. 29, 201 [1978] and Genossar & Rudman, op. cit.) and $LaNi_5$ (Tanguy et al., Mater. Res. Bull. 11, 1441 [1976]).

Although these attempts did improve the kinetics somewhat, certain essential disadvantages have not yet been eliminated from the resulting systems. The preliminary hydriding of magnesium doped with a foreign metal or intermetallic compound still demands drastic reaction conditions, and the system kinetics will be satisfactory and the reversible hydrogen content high only after many cycles of hydriding and dehydriding. Considerable percentages of foreign metal or of expensive intermetallic compound are also necessary to improve kinetic properties. Furthermore, the storage capacity of such systems are generally far below what would theoretically be expected for $MgH_2$.

It is known that the storage quality of magnesium and magnesium alloys can also be enhanced by the addition of materials which may help to break up stable oxides of magnesium. For example, such an alloy is $Mg_2Ni$, in which the Ni appears to form unstable oxides. In this alloy, thermodynamic examinations indicated that the surface reaction $Mg_2Ni+O_2 \rightarrow 2MgO+Ni$ extended over nickel metal inclusions which catalyze the hydrogen dissociation-absorption reaction. Reference may be had to A. Seiler et al., Journal of Less-Common Metals 73, 1980, pages 193 et seq.

One possibility for the catalysis of the hydrogen dissociation-absorption reaction on the surface of magnesium lies also in the formation of a two-phase alloy, wherein the one phase is a hydride former, and the other phase is a catalyst. Thus, it is known to employ galvanically-nickeled magnesium as a hydrogen storage, referring to F. G. Eisenberg et al. Journal of Less-Common Metals 74, 1980, pages 323 et seq. However, there were encountered problems during the adhesion and the distribution of the nickel over the magnesium surface.

In order to obtain an extremely dense and good adherent catalyst phase under the formation alone of equilibrium phases, it is also known that for the storage of hydrogen there can be employed an eutectic mixture of magnesium as a hydride-forming phase in conjunction with magnesium copper ($Mg_2Cu$), referring to J. Genossar et al., Zeitschrift fur Physikalische Chemie Neue Folge 116, 1979, pages 215 et seq. The storage capacity per volume of material which is achieved through this magnesium-containing granulate does not, however, meet any high demands because of the quantity of magnesium copper which is required for the eutectic mixture.

The scientists of this era looked at various materials and postulated that a particular crystalline structure is required for hydrogen storage, see, for example, "Hydrogen Storage in Metal Hydride", Scientific American, Vol. 242, No. 2, pp. 118–129, February, 1980. It was found that it is possible to overcome many of the disadvantages of the prior art materials by utilizing a different class of materials, disordered hydrogen storage materials. For example, U.S. Pat. No. 4,265,720 to Guenter Winstel for "Storage Materials for Hydrogen" describes a hydrogen storage body of amorphous or finely crystalline silicon. The silicon is preferably a thin film in combination with a suitable catalyst and on a substrate.

Laid-open Japanese Patent Application No. 55-167401, "Hydrogen Storage Material," in the name of Matsumato et al, discloses bi or tri-element hydrogen storage materials of at least 50 volume percent amorphous structure. The first element is chosen from the group Ca, Mg, Ti, Zr, Hf, V, Nb, Ta, Y and lanthanides, and the second from the group Al, Cr, Fe, Co, Ni, Cu, Mn and Si. A third element from the group B, C, P and Ge can optionally be present. According to the teaching of No. 55-167401, the amorphous structure is needed to overcome the problem of the unfavorably high desorption temperature characteristic of most crystalline systems. A high desorption temperature (above, for example, 150° C.) severely limits the uses to which the system may be put.

According to Matsumoto et al, the material of at least 50% amorphous structure will be able to desorb at least some hydrogen at relatively low temperatures because the bonding energies of the individual atoms are not uniform, as is the case with crystalline material, but are distributed over a wide range.

Matsumoto et al claims a material of at least 50% amorphous structure. While Matsumoto et al does not provide any further teaching about the meaning of the term "amorphous," the scientifically accepted definition of the term encompasses a maximum short range order of about 20 Angstroms or less.

The use by Matsumato et al of amorphous structure materials to achieve better desorption kinetics due to the non-flat hysteresis curve is an inadequate and partial solution. The other problems found in crystalline hydrogen storage materials, particularly low useful hydrogen storage capacity at moderate temperature, remain.

However, even better hydrogen storage results, i.e., long cycle life, good physical strength, low absorption/desorption temperatures and pressures, reversibility, and resistance to chemical poisoning, may be realized if full advantage is taken of modification of disordered metastable hydrogen storage materials. Modification of disordered structurally metastable hydrogen storage materials is described in U.S. Pat. No. 4,431,561 to Stanford R. Ovshinsky et al. for "Hydrogen Storage Materials and Method of Making the Same". As described therein, disordered hydrogen storage materials, characterized by a chemically modified, thermodynamically metastable structure, can be tailor-made to possess all the hydrogen storage characteristics desirable for a wide range of commercial applications. The modified hydrogen storage material can be made to have greater hydrogen storage capacity than do the single phase crystalline host materials. The bonding strengths between the hydrogen and the storage sites in these modified materials can be tailored to provide a spectrum of bonding possibilities thereby to obtain desired absorption and desorption characteristics. Disordered hydrogen storage materials having a chemically modified, thermodynamically metastable structure also have a greatly increased density of catalytically active sites for improved hydrogen storage kinetics and increased resistance to poisoning.

The synergistic combination of selected modifiers incorporated in a selected host matrix provides a degree and quality of structural and chemical modification that stabilizes chemical, physical, and electronic structures and conformations amenable to hydrogen storage.

The framework for the modified hydrogen storage materials is a lightweight host matrix. The host matrix is structurally modified with selected modifier elements to provide a disordered material with local chemical environments which result in the required hydrogen storage properties.

Another advantage of the host matrix described by Ovshinsky, et al. is that it can be modified in a substantially continuous range of varying percentages of modifier elements. This ability allows the host matrix to be manipulated by modifiers to tailor-make or engineer hydrogen storage materials with characteristics suitable for particular applications. This is in contrast to multi-component single phase host crystalline materials which generally have a very limited range of stoichiometry available. A continuous range of control of chemical and structural modification of the thermodynamics and kinetics of such crystalline materials therefore is not possible.

A still further advantage of these disordered hydrogen storage materials is that they are much more resistant to poisoning. As stated before, these materials have a much greater density of catalytically active sites. Thus, a certain number of such sites can be sacrificed to the effects of poisonous species, while the large number of non-poisoned active sites still remain to continue to provide the desired hydrogen storage kinetics.

Another advantage of these disordered materials is that they can be designed to be mechanically more flexible than single phase crystalline materials. The disordered materials are thus capable of more distortion during expansion and contraction allowing for greater mechanical stability during the absorption and desorption cycles.

One drawback to these disordered materials is that, in the past, some of the Mg based alloys have been difficult to produce. Particularly those materials that did not form solutions in the melt. Also, the most promising materials (i.e. magnesium based materials) were extremely difficult to make in bulk form. That is, while thin-film sputtering techniques could make small quantities of these disordered alloys, there was no bulk preparation technique.

Then in the mid 1980's, two groups developed mechanical alloying techniques to produce bulk disordered magnesium alloy hydrogen storage materials. Mechanical alloying was found to facilitate the alloying of elements with vastly different vapor pressures and melting points (such as Mg with Fe or Ti etc.), especially when no stable intermetallic phases exist. Conventional techniques like induction melting have been found to be inadequate for such purposes.

The first of the two groups was a team of French scientists which investigated mechanical alloying of materials of the Mg—Ni system and their hydrogen storage properties. See Senegas, et al., "Phase Characterization and Hydrogen Diffusion Study in the Mg—Ni—H System", Journal of the Less-Common Metals, Vol. 129, 1987, pp. 317–326 (binary mechanical alloys of Mg and Ni incorporating 0, 10, 25 and 55 wt. % Ni); and also, Song, et al. "Hydriding and Dehydriding Characteristics of Mechanically Alloyed Mixtures Mg—x wt. % Ni (x=5, 10, 25 and 55)", Journal of the Less-Common Metals, Vol. 131, 1987, pp. 71–79 (binary mechanical alloys of Mg and Ni incorporating 5, 10, 25 and 55 wt. % Ni).

The second of the two groups was a team of Russian scientists which investigated the hydrogen storage properties of binary mechanical alloys of magnesium and other metals. See Ivanov, et al., "Mechanical Alloys of Magnesium—New Materials For Hydrogen Energy", Doklady Physical Chemistry (English Translation) vol. 286:1–3, 1986, pp. 55–57, (binary mechanical alloys of Mg with Ni, Ce, Nb, Ti, Fe, Co, Si and C); also, Ivanov, et al. "Magnesium Mechanical Alloys for Hydrogen Storage", Journal of the Less-Common Metals, vol. 131, 1987, pp. 25–29 (binary mechanical alloys of Mg with Ni, Fe, Co, Nb and Ti); and Stepanov, et al., "Hydriding Properties of Mechanical Alloys of Mg—Ni", Journal of the Less-Common Metals, vol. 131, 1987, pp. 89–97 (binary mechanical alloys of the Mg—Ni system). See also the collaborative work between the French and Russian groups, Konstanchuk, et al., "The Hydriding Properties of a Mechanical Alloy With Composition Mg-25% Fe", Journal of the Less-Common Metals, vol. 131, 1987, pp. 181–189 (binary mechanical alloy of Mg and 25 wt. % Fe).

Later, in the late 1980's and early 1990's, a Bulgarian group of scientists (sometimes in collaboration with the Russian group of scientists) investigated the hydrogen storage properties of mechanical alloys of magnesium and metal oxides. See Khrussanova, et al., "Hydriding Kinetics of Mixtures Containing Some 3d-Transition Metal Oxides and Magnesium", Zeitschrift fur Physikalische Chemie Neue Folge, Munchen, vol. 164, 1989, pp. 1261–1266 (comparing binary mixtures and mechanical alloys of Mg with $TiO_2$, $V_2O_5$, and $Cr_2O_3$); and Peshev, et al., "Surface Composition of Mg—$TiO_2$ Mixtures for Hydrogen Storage, Prepared by Different Methods", Materials Research Bulletin, vol. 24, 1989, pp. 207–212 (comparing conventional mixtures and mechanical alloys of Mg and $TiO_2$). See also, Khrussanova, et al., "On the Hydriding of a Mechanically Alloyed Mg(90%)—$V_2O_5$ (10%) Mixture", International Journal of Hydrogen Energy, vol. 15, No. 11, 1990, pp. 799–805 (investigating the hydrogen storage properties of a binary mechanical alloy of Mg and $V_2O_5$); and Khrussanova, et al., "Hydriding of Mechanically Alloyed Mixtures of Magnesium With $MnO_2$, $Fe_2O_3$, and NiO", Materials Research Bulletin, vol. 26, 1991, pp. 561–567 (investigating the hydrogen storage properties of a binary mechanical alloys of Mg with and $MnO_2$, $Fe_2O_3$, and NiO). Finally, see also, Khrussanova, et al., "The Effect of the d-Electron Concentration on the Absorption Capacity of Some Systems for Hydrogen Storage", Materials Research Bulletin, vol. 26, 1991, pp. 1291–1298 (investigating d-electron concentration effects on the hydrogen storage properties of materials, including mechanical alloys of Mg and 3-d metal oxides); and Mitov, et al., "A Mossbauer Study of a Hydrided Mechanically Alloyed Mixture of Magnesium and Iron(III) Oxide", Materials Research Bulletin, vol. 27, 1992, pp. 905–910 (Investigating the hydrogen storage properties of a binary mechanical alloy of Mg and $Fe_2O_3$).

More recently, a group of Chinese scientists have investigated the hydrogen storage properties of some mechanical alloys of Mg with other metals. See, Yang, et al., "The Thermal Stability of Amorphous Hydride $Mg_{50}Ni_{50}H_{54}$ and $Mg_{30}Ni_{70}H_{45}$", Zeitschrift fur Physikalische Chemie, Munchen, vol. 183, 1994, pp. 141–147 (Investigating the hydrogen storage properties of the mechanical alloys $Mg_{50}Ni_{50}$ and $Mg_{30}Ni_{70}$); and Lei, et al., "Electrochemical Behavior of Some Mechanically Alloyed Mg—Ni-based Amorphous Hydrogen Storage Alloys", Zeitschrift fur Physikalische Chemie, Munchen, vol. 183, 1994, pp. 379–384 (investigating the electrochemical [i,.e Ni-MH battery] properties of some mechanical alloys of Mg—Ni with Co, Si, Al, and Co—Si).

Short-range, or local, order is elaborated on in U.S. Pat. No. 4,520,039 to Ovshinsky, entitled Compositionally Varied Materials and Method for Synthesizing the Materials, the contents of which are incorporated by reference. This patent disclosed that disordered materials do not require any periodic local order and how spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously shown that the number of surface sites could be significantly increased by making an amorphous film in which the bulk thereof resembled the surface of the desired relatively pure materials. Ovshinsky also utilized multiple elements to provide additional bonding and local environmental order which allowed the material to attain the required electrochemical characteristics. As Ovshinsky explained in Principles and Applications of Amorphicity, Structural Change, and Optical Information Encoding, 42 Journal De Physique at C4-1096 (October 1981):

Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . .

Once amorphicity was understood as a means of introducing surface sites in a film, it was possible to produce "disorder" that takes into account the entire spectrum of effects such as porosity, topology, crystallites, characteristics of sites, and distances between sites. Thus, rather than searching for material changes that would yield ordered materials having a maximum number of accidentally occurring surface bonding and surface irregularities, Ovshinsky and his team at ECD began constructing "disordered" materials where the desired irregularities were tailor made. See, U.S. Pat. No. 4,623,597, the disclosure of which is incorporated by reference.

The term "disordered", as used herein to refer to electrochemical electrode materials, corresponds to the meaning of the term as used in the literature, such as the following:

A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . .

S. R. Ovshinsky, The Shape of Disorder, 32 Journal of Non-Crystalline Solids at 22 (1979) (emphasis added).

The "short-range order" of these disordered materials are further explained by Ovshinsky in The Chemical Basis of Amorphicity: Structure and Function, 26:8–9 Rev. Roum. Phys. at 893–903 (1981):

[S]hort-range order is not conserved . . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Based on these principles of disordered materials, described above, three families of extremely efficient electrochemical hydrogen storage negative electrode materials were formulated. These families of negative electrode materials, individually and collectively, will be referred to hereinafter as "Ovonic." One of the families is the La–Ni$_5$-type negative electrode materials which have recently been heavily modified through the addition of rare earth elements such as Ce, Pr, and Nd and other metals such as Mn, Al, and Co to become disordered multicomponent alloys, i.e., "Ovonic". The second of these families is the Ti—Ni-type negative electrode materials which were introduced and developed by the assignee of the subject invention and have been heavily modified through the addition of transition metals such as Zr and V and other metallic modifier elements such as Mn, Cr, Al, Fe, etc. to be disordered, multicomponent alloys, i.e., "Ovonic." The third of these families are the disordered, multicomponent MgNi-type negative electrode materials described in U.S. Pat. Nos. 5,506,069; 5,616432; and 5,554,456 (the disclosures of which are hereby incorporated by reference).

Based on the principles expressed in Ovshinsky's '597 patent, the Ovonic Ti—V—Zr—Ni type active materials are disclosed in U.S. Pat. No. 4,551,400 to Sapru, Fetcenko, et al. ("the '400 patent"), the disclosure of which is incorporated by reference. This second family of Ovonic materials reversibly form hydrides in order to store hydrogen. All the materials used in the '400 patent utilize a Ti—V—Ni composition, where at least Ti, V, and Ni are present with at least one or more of Cr, Zr, and Al. The materials of the '400 patent are generally multiphase polycrystalline materials, which may contain, but are not limited to, one or more phases of Ti—V—Zr—Ni material with C.sub.14 and C.sub.15 type crystal structures. Other Ovonic Ti—V—Zr—Ni alloys are described in commonly assigned U.S. Pat. No. 4,728,586 ("the '586 patent"), titled Enhanced Charge Retention Electrochemical Hydrogen Storage Alloys and an Enhanced Charge Retention Electrochemical Cell, the disclosure of which is incorporated by reference.

The characteristic surface roughness of the metal electrolyte interface is a result of the disordered nature of the material as disclosed in commonly assigned U.S. Pat. No. 4,716,088 to Reichman, Venkatesan, Fetcenko, Jeffries, Stahl, and Bennet, the disclosure of which is incorporated by reference. Since all of the constituent elements, as well as many alloys and phases thereof, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are important in determining its macroscopic electrochemical characteristics.

In addition to the physical nature of its roughened surface, it has been observed that V—Ti—Zr—Ni type alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface has a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—interacts with metal hydride alloys in catalyzing the electrochemical charge and discharge reaction steps, as well as promoting fast gas recombination.

Finally, in U.S. Pat. No. 5,616,432 ('432 patent) inventors of Ovonic Battery Company produced Mg—Ni—Co—Mn alloys similar to the base alloys of the present inventive composite hydrogen storage material. The storage capacity of these alloys was limited to about 2.7 weight percent and none of the stored hydrogen was desorbed from the alloy at 30° C. FIG. 1 plots the PCT curve of the '432 patents thin film alloy (reference symbol Δ) with that of the present composite hydrogen storage material (reference symbol ♦). As can be seen, the hydrogen storage composite materials of the present invention adsorb more than 4 weight percent of hydrogen, and what is even more remarkable is that this hydrogen can be desorbed at a temperature of 30° C.

Thus until the advent of the present invention, no prior art material was capable of simultaneously meeting the desired material properties of: 1) a high hydrogen storage capacity; 2) light weight materials; 3) adequate hydrogen absorption/desorption temperatures; 4) adequate absorption/desorption pressures; 5) fast absorption kinetics; and 6) a long absorption/desorption cycle life, all in an inexpensive and easy to produce material.

SUMMARY OF THE INVENTION

The present invention is a Mg—Ni composite material having an Mg—Ni based alloy; and a coating of a catalytically active metal deposited on at least a portion of a surface of the Mg—Ni based alloy. The coating is less than about 200 angstroms thick and the composite material provides for a storage capacity of up to 4.86 weight percent hydrogen with a high adsorption rate at temperatures as low as 30° C. and an absorption pressure of less than about 150 PSI. More remarkably, the composite materials also have the ability to fully desorb the stored hydrogen at temperatures as low as 250° C., an ability not heretofore seen in materials with such a high total storage capacity. Even more amazingly the same material can desorb 2.51 weight percent of the stored hydrogen at 90° C. and 1.2 weight percent at 30° C. In addition these material are relatively inexpensive and easy to produce.

The catalytically active metal deposited on at least a portion of a surface of said Mg—Ni based alloy is more preferably less than about 150 angstroms thick and most preferably less than about 100 angstroms thick. The coating of catalytically active metal is preferably formed from at least one metal selected from the group consisting of iron, palladium, platinum, iridium, gold, and mixtures or alloys thereof. Iron, and palladium are the most preferred catalytic coatings.

The base alloy preferably has a two phase amorphous structure. The Mg—Ni based alloy has a magnesium content which ranges from 40 to 65 atomic percent of the alloy and more preferably from 45 to 65 atomic percent of the alloy. The nickel content ranges from 25 to 45 atomic percent of the base alloy and preferably the nickel content is from 30 to 40 atomic percent. The Mg—Ni based alloy further contains manganese and cobalt. The cobalt content is between 1 and 10 atomic percent of the alloy and preferably between 2 and 6 atomic percent of the alloy. The manganese content is between 1 and 10 atomic percent of the alloy and preferably between 3 and 8 atomic percent of the alloy.

The Mg—Ni based alloy may further contain at least one element from the group consisting of Fe, Al, Zr, Zn, Cu, Ag, Cu, B, La, Ru, Re, Li, Cr, Pd, Si, V, Sr Misch Metal and mixtures or alloys thereof incorporated into the alloy in quantities totaling less than about 5 atomic percent of the alloy for all inclusions and each individual element is incorporated into said alloy in quantities less than about 3 atomic percent.

The Mg—Ni composite material is capable of adsorbing at least 3 weight percent hydrogen at a pressure of less than about 150 PSI and more preferably capable of adsorbing at least 3 weight percent hydrogen at a pressure of less than about 50 PSI. The Mg—Ni composite material absorbs 3 weight percent hydrogen in less than two minutes at 30° C. and absorbs 3.5 weight percent hydrogen in less than 10 minutes at 30° C.

DETAILED DESCRIPTION OF THE INVENTION

Figure 1:
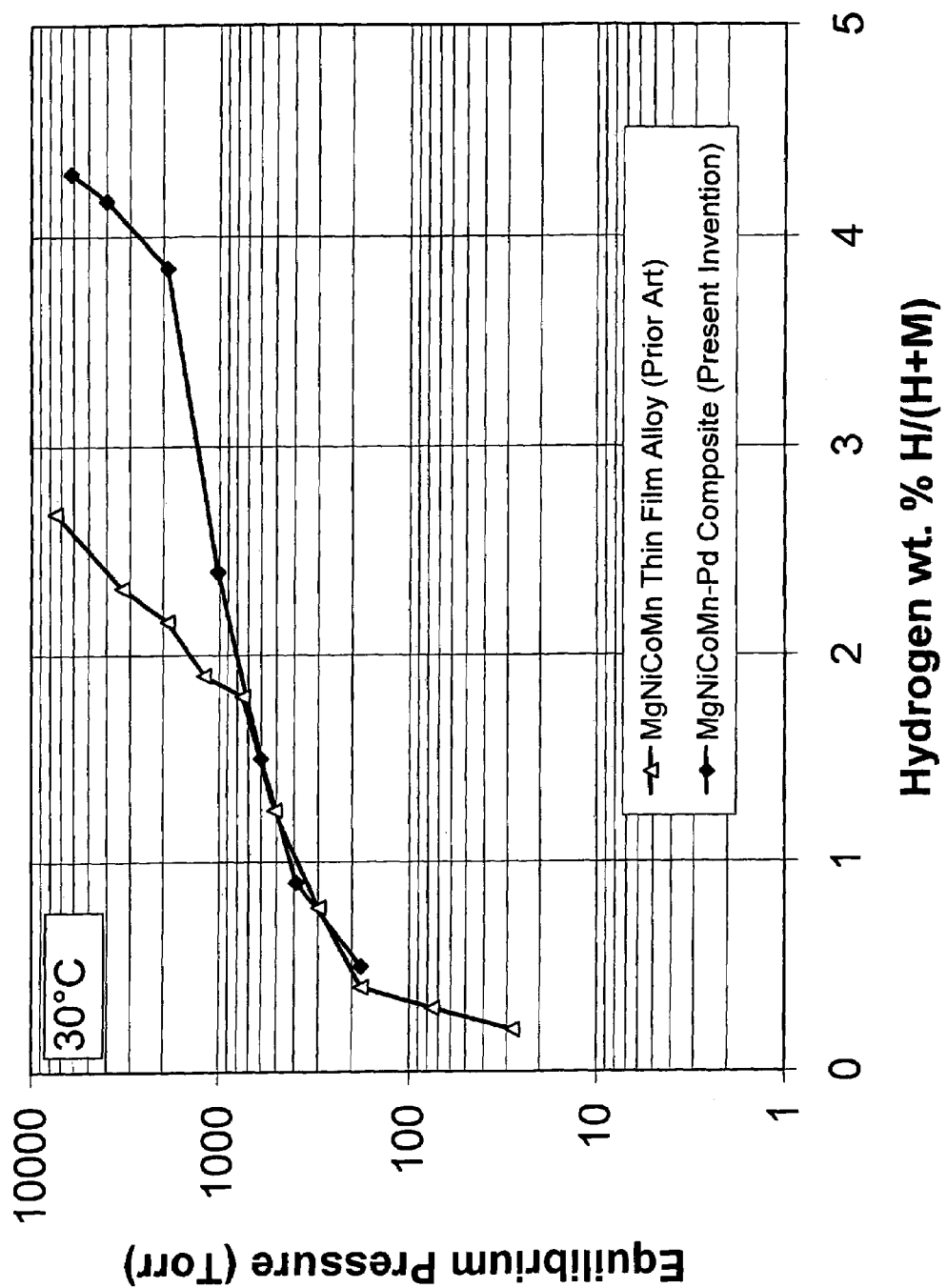
FIG. 1 plots the PCT curve of a prior art thin film alloy with that of the present composite hydrogen storage material, specifically shown is the increased storage capacity at 30° C.

The Mg—Ni alloy composite materials of the instant invention exhibit, for the first time ever, the ability to store and release significant quantities of hydrogen at temperatures less than about 100° C. with good kinetics. Specifically, the instant composite materials can store greater than about 3 weight percent hydrogen at 30° C. More preferably these materials can store greater than about 3.5 weight percent hydrogen and most preferably they can store more than about 4 weight percent hydrogen at 30° C. The base alloys are produced by melt spinning and mechanical alloying and have an addition of a minute quantity of palladium and/or iron on at least a portion of the surface of the alloy to form the composite. As discussed hereinafter, the conditions of the melt spinning and mechanical alloying of the base alloy play a major role in creating the unique properties of the instant composite materials.

The preferred composite materials of the instant invention generally contain a base Mg—Ni alloy having a two phase amorphous microstructure. The processes of producing these materials, which will be described herein below, are key to producing Mg—Ni alloys which have this two phase amorphous microstructure. That is, if the processing is not correct, materials with a single phase structure will form. This mixed phase structure has a Mg-rich phase and a Ni-rich phase, the inventors have found that the composite materials that have the best kinetics when the ratio of the Mg-rich phase to Ni-rich phase in the base alloy is high. Specifically, it is believed that the Mg-rich amorphous phase acts as a storage phase and the Ni-rich phase acts as a catalytic phase to disassociate the molecular hydrogen to atomic hydrogen, which is then stored in the Mg-rich phase material. Thus, when making the most preferred materials of the present invention, the processes will preferably avoid the production of a single amorphous phase material. It should be noted that by amorphous, it is meant that the structure is predominantly amorphous. The structure may contain some microcrystalline or nanocrystalline areas and still be considered amorphous. Amorphous portions of the materials will be defined herein as having no long-range order greater than about 20 Angstroms.

The base alloys of the composite materials of the instant invention comprise mainly magnesium and nickel. Table 1 indicates the alloy designation and nominal compositions for specific examples of the base alloy according to the instant invention. Nominal magnesium content ranges from 40 to 65 atomic percent of the alloy and preferably the magnesium content ranges from 45 to 65 atomic percent of the alloy. The nickel content ranges from 25 to 45 atomic percent of the base alloy and preferably the nickel content is from 30 to 40 atomic percent.

The base alloy preferably also contains manganese and cobalt in quantities much lower than the content of Mg and Ni. The cobalt content is kept as low as possible to reduce the cost of the alloy, and still produce stable, high storage capacity alloys. With that in mind, the cobalt content is between 1 and 10 atomic percent of the alloy and preferably between 2 and 6 atomic percent. The manganese content is between 1 and 10 atomic percent and preferably between 3 and 8 atomic percent.

Finally, the alloy may also contain elements which help to enhance achievement and stabilization of the amorphous structure of the base alloy and increase the catalytic activity of the alloy, thereby increasing the kinetics thereof. Such elements may include Fe, Al, Zr, Zn, Cu, Ag, Cu, B, La, Ru, Re, Li, Cr, Pd, Si, V, Sr, Misch Metal and mixtures or alloys thereof. These elements, if present will be in quantities totaling less than about 5 atomic percent, and each individual element will be included less than about 3 atomic percent. Iron is a preferred additive.

Figure 2:
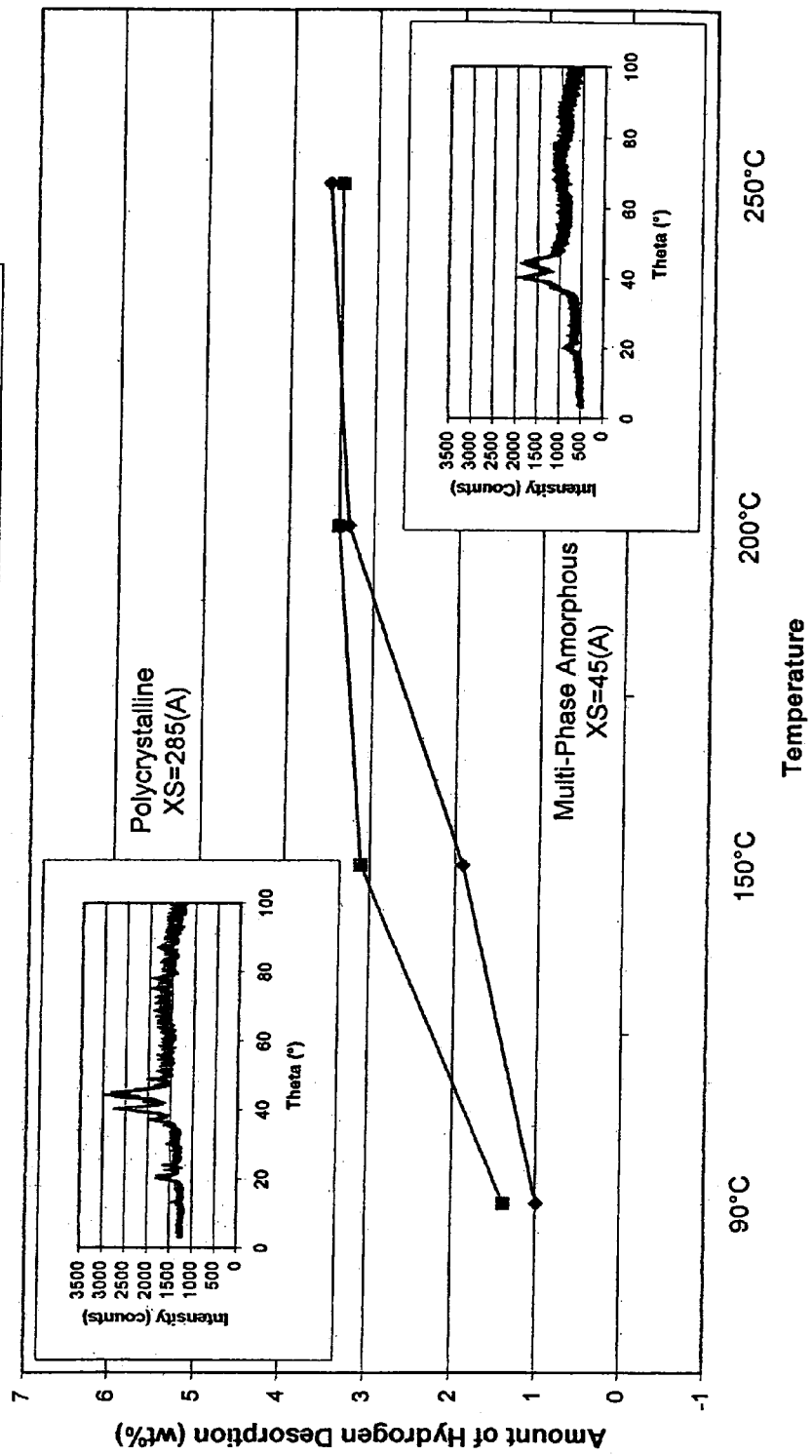
FIG. 2 depicts the XRD plot and the corresponding hydrogen desorption characteristics of composite materials of the present invention formed by two different processes.

The following describes the basic process of producing the base alloys for the hydrogen storage composite materials of the present invention. One kilogram of raw materials having a ratio of ingredients to produce the desired composition is placed into a boron nitride (BN) crucible within a melt spinning chamber. An additional 50 grams of magnesium is added to compensate evaporative losses of magnesium during melting/spinning. The temperature of crucible is ramped up to 1050° C. within 40 minutes. A boron nitride rod which plugs a hole in the bottom of the crucible is removed and liquid metal is forced out from the bottom of the crucible toward a high speed, water-cooled Be—Cu alloy melt-spinning wheel rotating at a linear speed of about 10 m/sec. The alloy is quenched/solidified when it hits the wheel and the ribbons of alloy material that are formed are collected from the bottom of the chamber. After proper cooling for more than 12 hours, the ribbons and flakes were collected and transferred under a protective argon atmosphere to an attritor (Union Process Model S-1) for mechanical alloying (MA). Two different MA processes were used. The first was a 48 hour continuous grinding in an argon atmosphere without any additives which yielded a mixed microcrystalline and amorphous structure. The average crystallite size was 45 angstrom determined by the full width at half maximum from XRD peaks. The second process used small amount of graphite and heptane as grinding aids. The carbon and heptane help to reduce the amount of alloy powder which sticks to the walls of the attritor and also reduces the oxygen contamination of the alloy material. The grinding time was reduced to only two hours as opposed to the 48 hours of the other method. The resulting mircostructure from this second method is a polycrystalline material with an average crystallite size of 285 angstrom. The XRD of alloy materials from two processes and their corresponding hydrogen desorption characteristics are shown in FIG. 2. Although the total desorption amounts from both process were the same, the 2 hour mechanically alloyed sample did provide faster desorption kinetics and was more economical to produce. Therefore, the second method is more preferred.

To produce the composite material of the present invention, powder is discharged from the bottom of the attritor into a sealed container and then transferred to a sifter to classify the powder into various sizes. For the instant examples only powder passing through a 200-mesh screen is used. Powder is pressed onto an expanded Ni-substrate inside a glove box using a 30-ton pneumatic press. The surfaces of the pressed sample are coated with a 100 Å layer of a catalytic metal by thermal evaporation in an Edward Auto 306 evaporator. The composite material sample is then tested in a pressure-concentration-isotherm (PCT) apparatus to determine its gas phase hydrogen absorption/desorption characteristics.

Figure 3B:
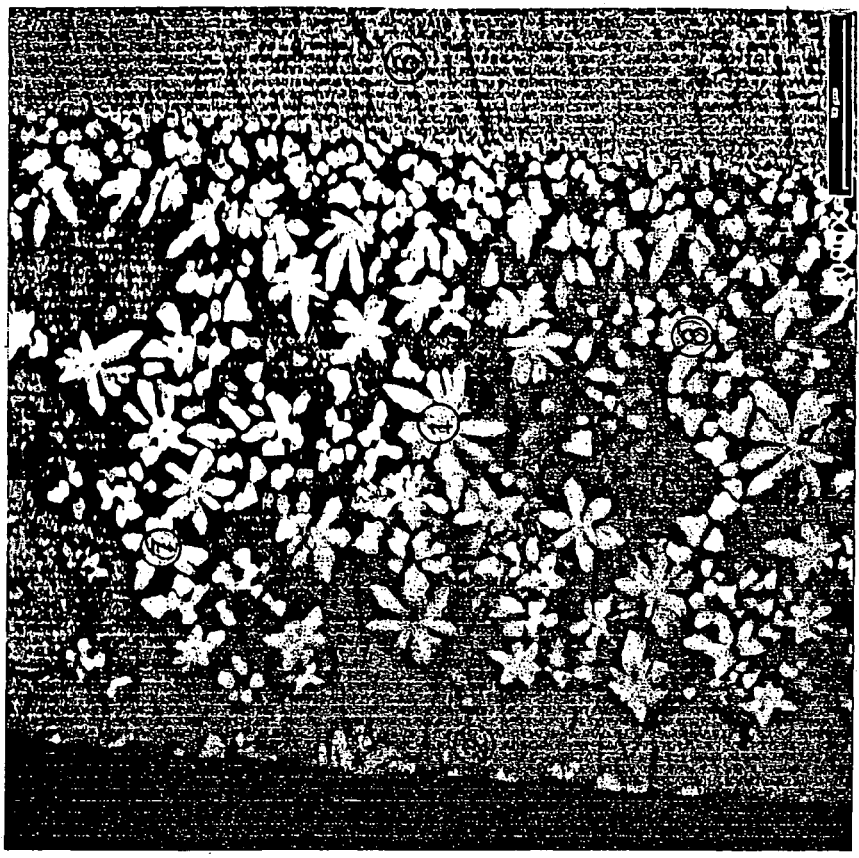
FIGS. 3A and 3B show cross-sectional micrographs of a melt spun ribbon of a base alloy composition useful for the composite material of the instant invention at 600× and 4000×, respectively.
Figure 3A:
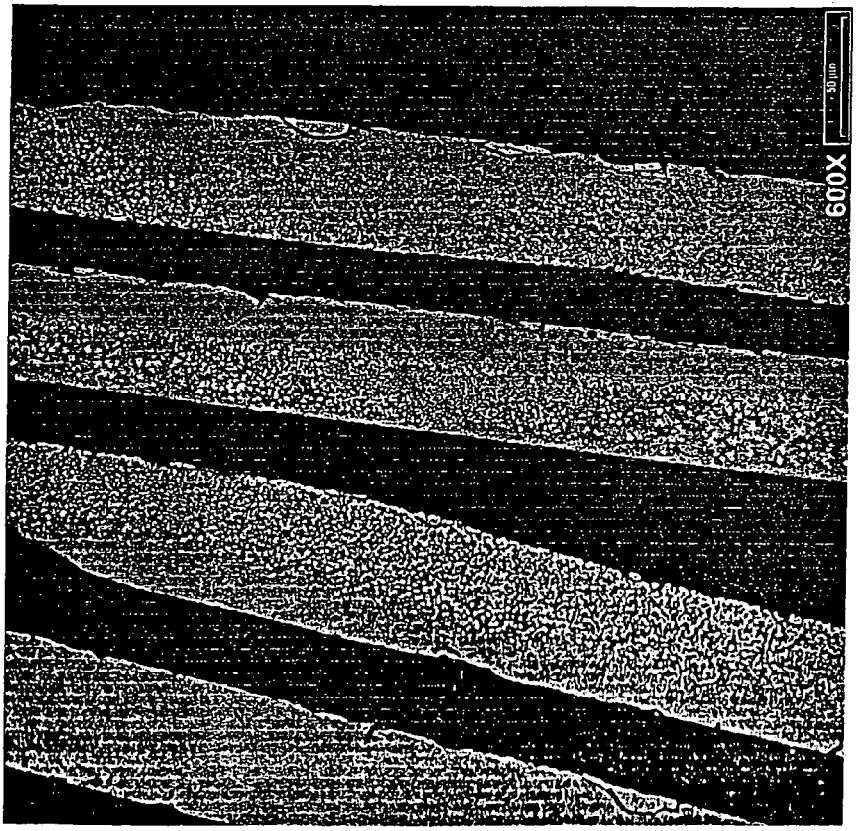

FIGS. 3A and 3B show cross-sectional SEM micrographs of a melt spun ribbon of a base alloy composition useful for the composite material of the instant invention at 600× and 4000×, respectively. This melt spun ribbon shows gross phase segregation into large crystallites of the two phases within portions of the ribbon. Specifically, in this example, the large crystallites appear on the air side of a melt spun ribbon produced on a chilled roller melt quenching apparatus. This gross segregation presents itself as mottled areas in FIG. 2A and as the snowflake shaped areas in FIG. 3B. FIG. 3B also shows a section of the melt spun ribbon that does not show the growth of large crystallites on the right hand side of the cross section.

Figure 4:
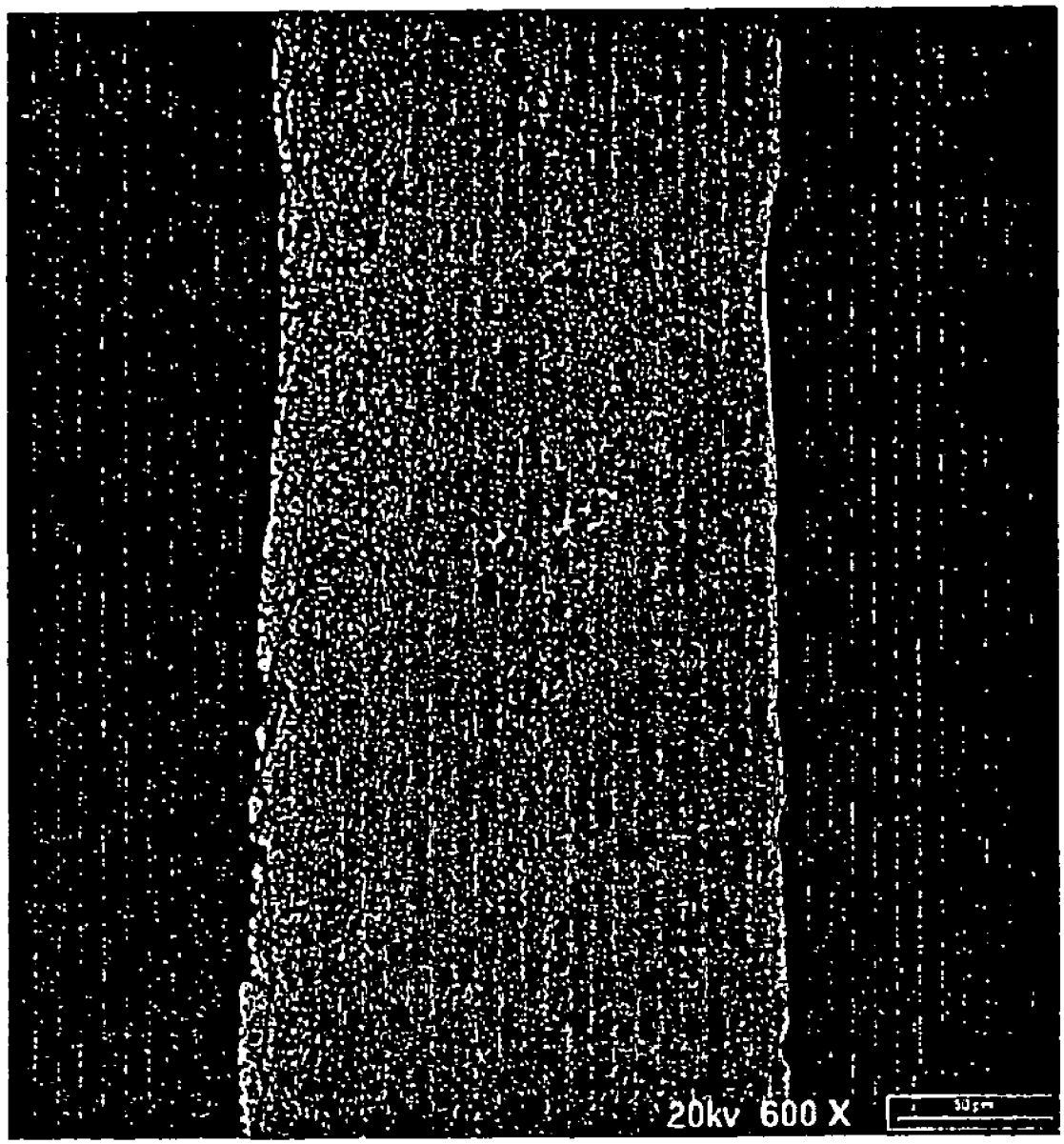
FIG. 4 shows another cross section micrograph of a melt spun ribbon of a base alloy composition useful for the composite material of the instant invention at 600×, specifically shown is the desired degree of uniformity of the melt spun ribbon.

FIG. 4 shows another cross section SEM micrograph of a melt spun ribbon of an alloy composition of the instant invention at 600×. This ribbon shows no sign of the growth of large crystallites of Mg-rich and Ni-rich phases. Thus the parameters of the melt quenching (melt spinning) are important and should be set so that few if any large crystallites are formed when the alloy melt is quenched. The reason for the desire to eliminate the larger crystallites is that the next step in the process of making the base alloy materials is a mechanical grinding/alloying step in which the melt spun ribbon materials are mechanically alloyed for up to 72 hours to produce an amorphous material. The larger the crystallites in the melt spun ribbon, the longer the mechanical alloying required to destroy these crystallites and form the amorphous microstructure.

Figure 5:
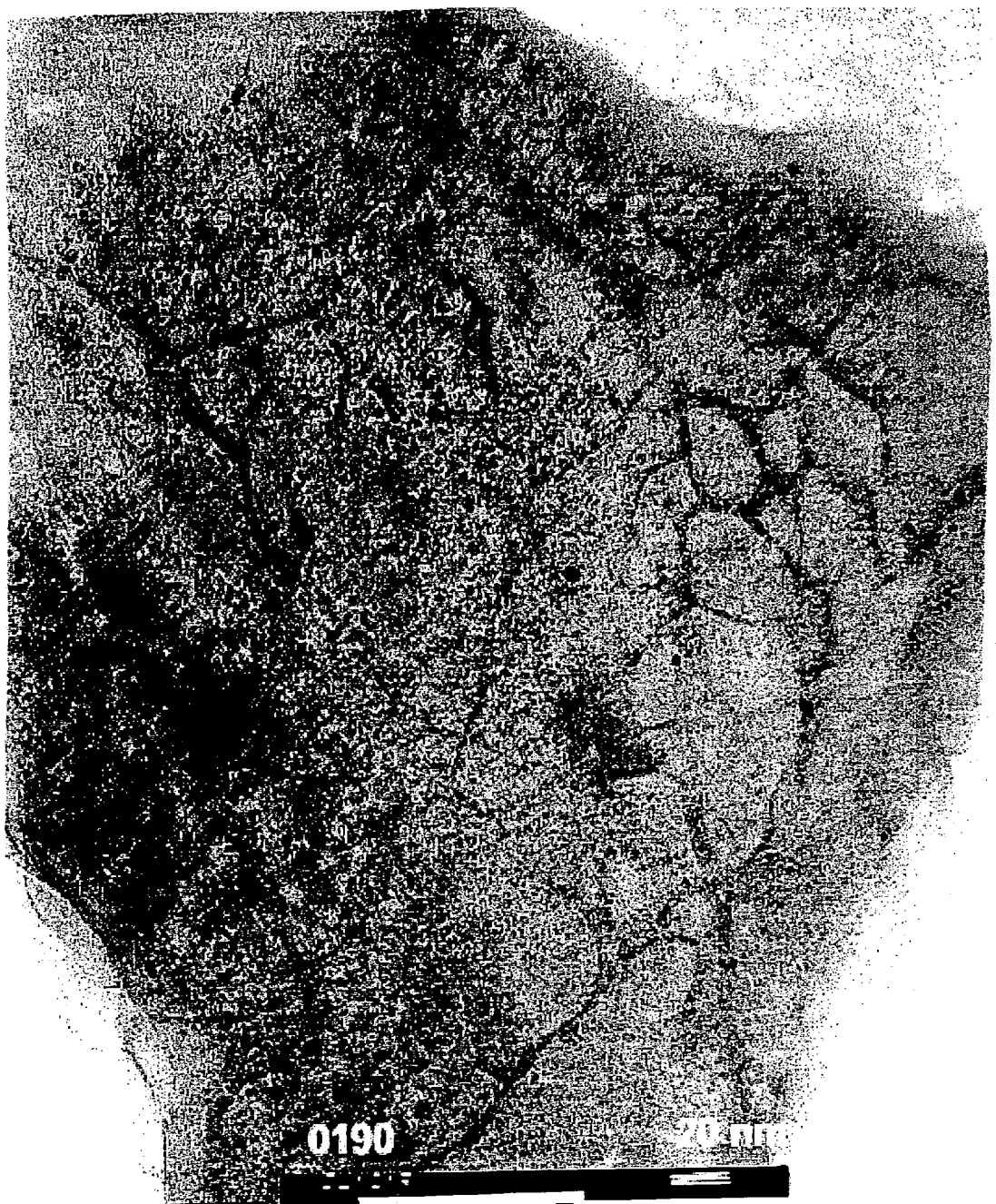
FIG. 5 is a high resolution TEM micrograph of the a base alloy composition useful for the composite material of the present invention, specifically the TEM micrographs reveal some three-dimensional micro-tube structures imbedded in the amorphous bulk.

FIG. 5 is a high resolution TEM micrograph of an inventive base alloy of the present invention. The TEM micrograph reveals three-dimensional tube-like structures imbedded in the amorphous bulk. These tube-like structures or micro-tubes have never been reported in the prior art of mechanical alloyed materials. These tube structures are believed to be the product of rolling up of two-dimensional sheets during the mechanical alloying process in the attritor. The morphology of these micro-tubes is similar to the recently found nano-tube structures made from carbon. While the actual function of these micro-tubes and their connection to the material's hydrogen storage capacity is not clear at present time, the inventors believe this special connecting tube structure may have a positive contribution to the bulk hydrogen diffusion since they offer a non-conventional network and may very well act as proton conduction channels in the bulk alloy. It is further believed that the enhanced hydrogen storage of the base alloys of the inventive composite materials may be due to a combination of chemically and physically adsorbed hydrogen. The Mg—Ni micro-tubes appear to contain a degree of porosity which may allow physi-adsorbed hydrogen which would be available (desorbed) at low temperatures. The micro-tubes also contribute an extra degree of disorder to the material of the present invention. In addition to the tube structure discussed above, the electron diffraction pattern of the material also indicates the co-existence of microcrystalline and amorphous regions. It is this special combination of various microstructures that makes the material capable of reversibly storing a considerable amount of hydrogen at relatively low temperatures and low working hydrogen pressures. The micro-tubes appear as an inner core of Ni-rich material surrounded by an outer sheathing of Mg-rich material.

Figure 6:
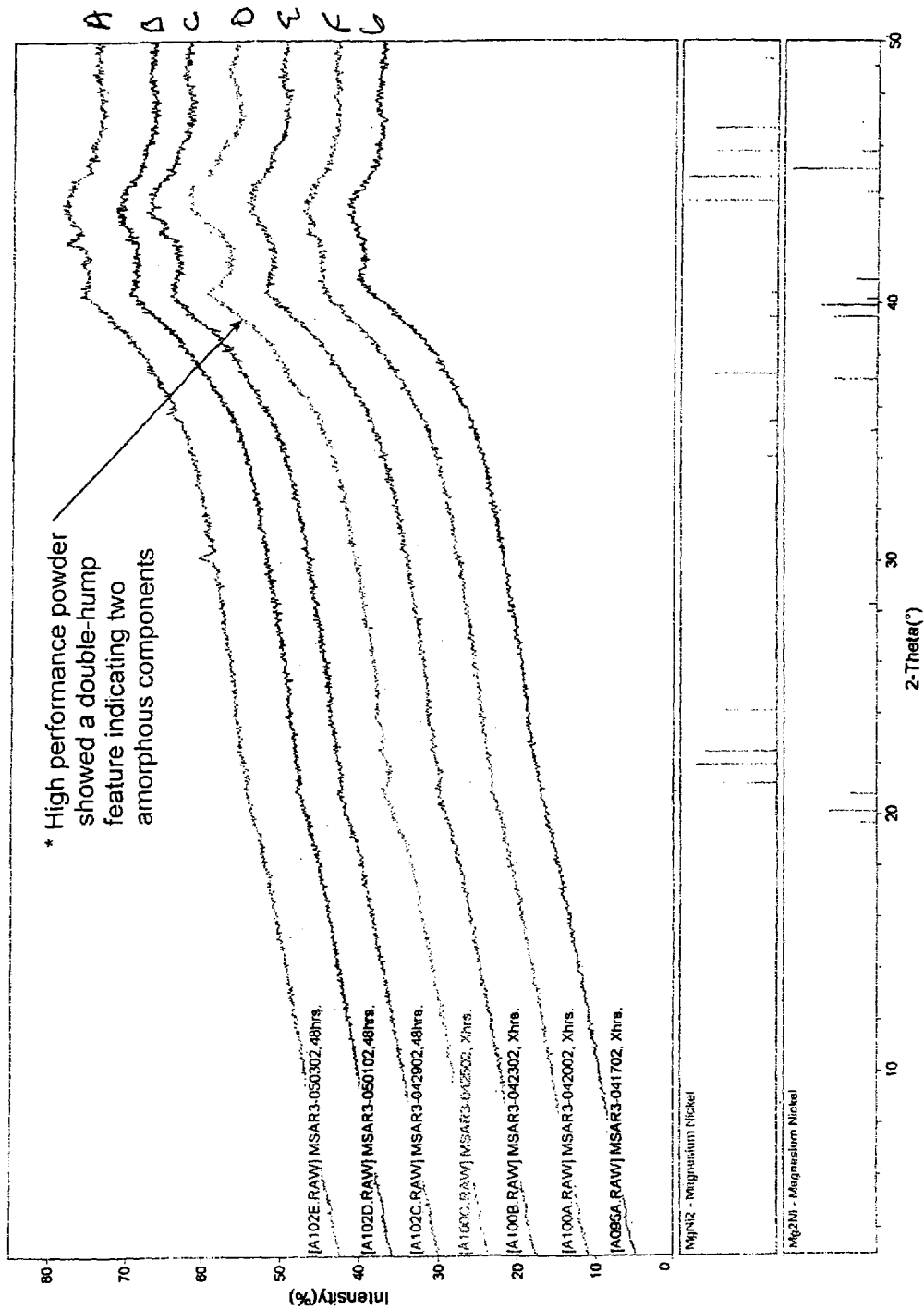
FIG. 6 depicts x-ray diffraction plots of different base alloy materials made according to the production process of the instant invention.

Different base alloy materials were made according to the production process of the instant invention. X-ray diffraction plots of the different base alloys are shown as curves A–G in FIG. 6. It is significant to note that, as discussed above, the sample having the most pronounced two-phase amorphous structure (curve D) had the best performance of all the materials (especially desorption kinetics). That is, the material having a dual amorphous phase structure out performed similar alloys having a single amorphous phase. Analysis shows that one of the two separate amorphous components of the dual amorphous phase structure material is enriched in Mg, while the other is enriched in Ni when compared to each other. While not wishing to be bound by theory, it is believed that the Ni-rich component may act as the catalytic phase, while the Mg-rich component may be the storage phase.

Figure 7B:
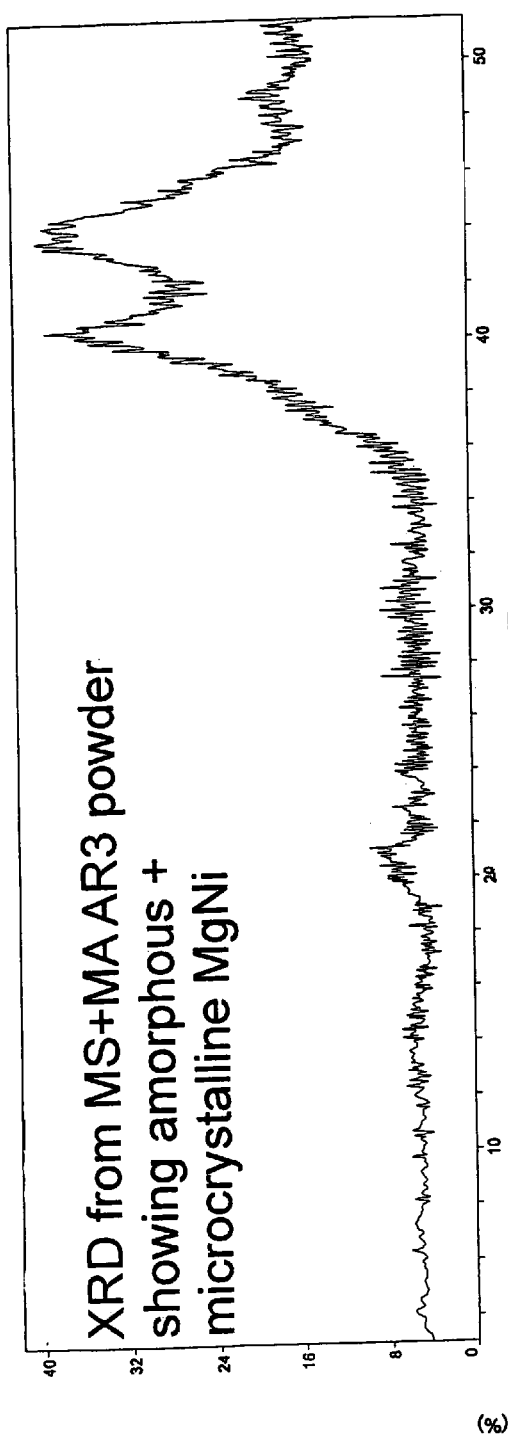
FIGS. 7A and 7B are x-ray diffraction plots of a base alloy of the present invention after melt spinning, but before mechanical alloying and after mechanical alloying respectively.
Figure 7A:
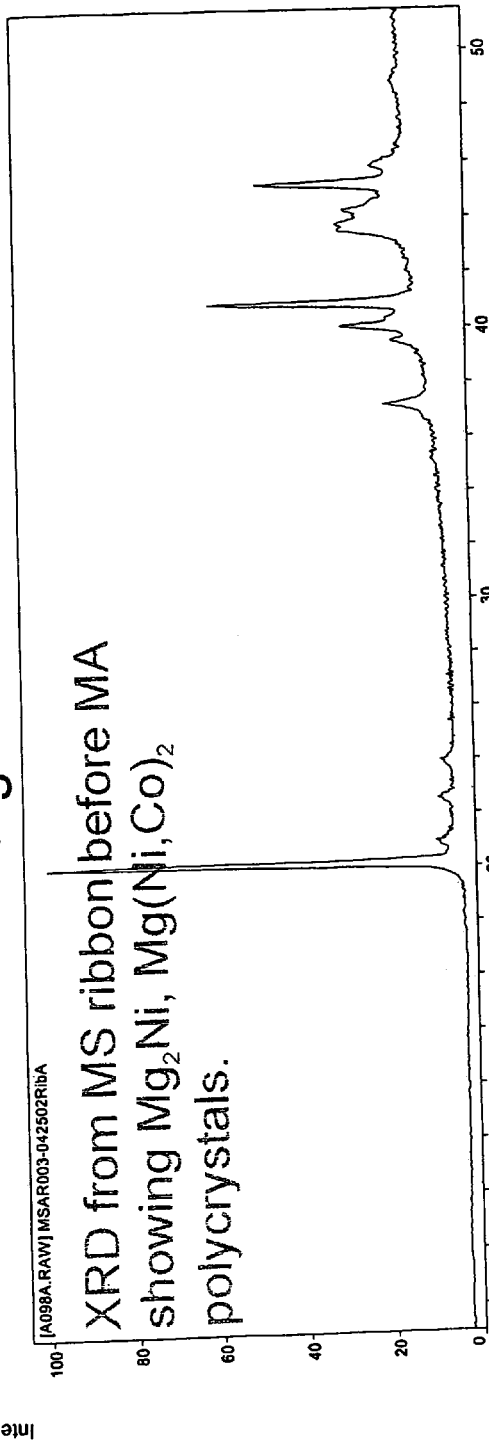

FIGS. 7A and 7B are x-ray diffraction plots of a base alloy (designated AR3-MS425) of the present invention after melt spinning, but before mechanical alloying and after mechanical alloying respectively. As can be seen, the as melt spun material is crystalline having sharp peaks. After mechanical alloying, the material becomes mostly amorphous showing very much widened peaks. FIG. 7B also indicates that a dual amorphous phase material results from the mechanical alloying.

Comparison of two different methods of alloy preparation using the same chemical composition of the base alloy (one forming a single phase amorphous structure and the other forming a two phase structure) shows some interesting results. A single amorphous phase structure material, having a nominal overall composition of $Mg_{49}Ni_{41}Mn_7Co_3$ (atomic %) was produced. This material (designated AR3-MS420) showed a hydrogen storage capacity of 4.1 wt %. This number is quite good as far as capacity goes, but the kinetics were slow, and to get the final capacity number in a reasonable time, the temperature of the alloy had to be raised to 90° C. While this is greater than the 30° C. in which the dual phase material can adsorb the hydrogen (discussed herein below), it is still far below the 300° C. required by other Mg materials of the prior art. Thus even this single phase material can be useful in situations where heat is available in the 80–100° C. range and kinetics are not critical. In comparison, the two phase material (designated AR3-MS425) had a slightly higher maximum hydrogen storage capacity (4.3%) than the AR3-MS420, but the absorption kinetics are greatly improved. Specifically the entire 4.3% absorption took only a few minutes at 30° C.

Turning now to another inventive alloy material having a nominal overall composition of $Mg_{61}Ni_{32.5}Mn_3Co_2Fe_{1.5}$ (designated AR031), this material had an incredible maximum hydrogen storage capacity of 4.86 wt. % at an amazing temperature of 30° C., and on top of the high storage capacity, the absorption kinetics of the material were quite good, absorbing the hydrogen within a matter of minutes.

Figure 8A:
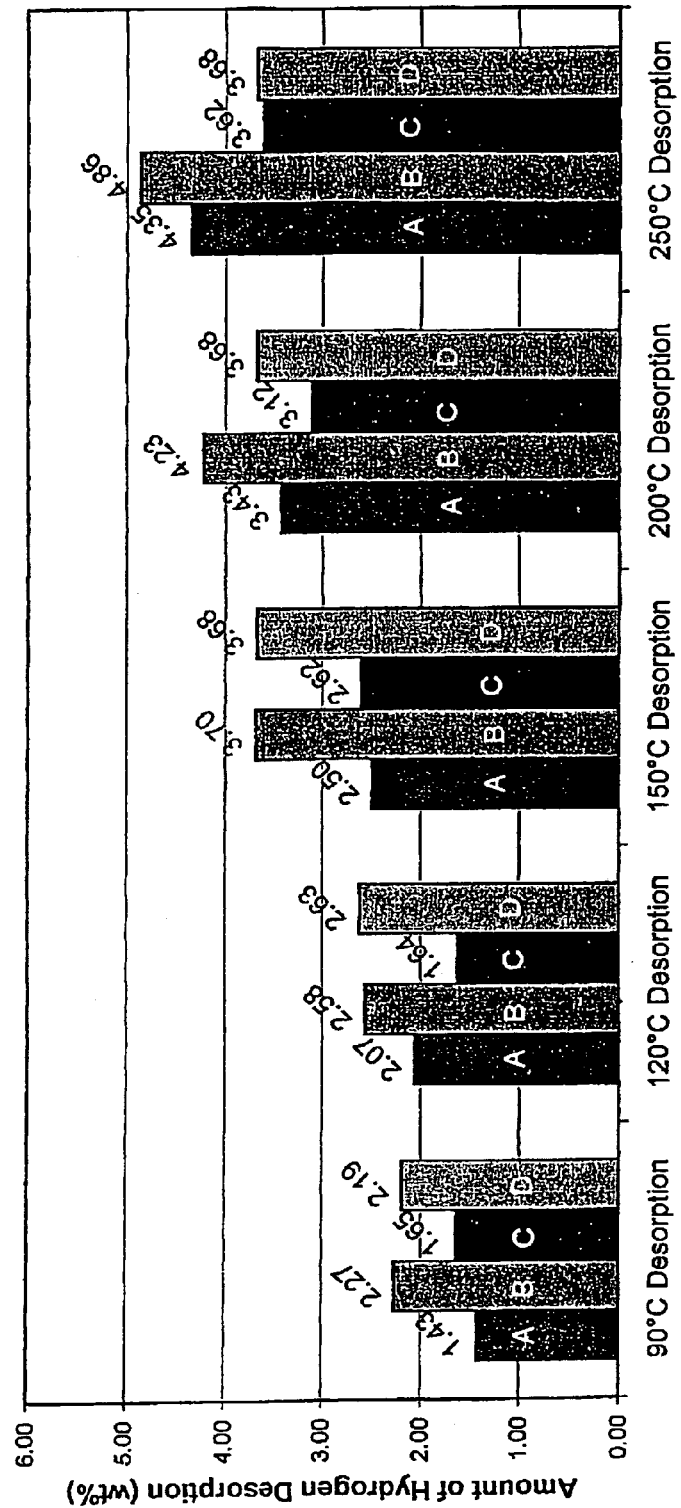
FIGS. 8A and 8B are bar graph plots of the amount of hydrogen (in weight percent) desorbed from composite materials produced from alloys of the instant invention coated with various catalytic coatings on the y-axis, versus a different desorption temperatures on the x-axis.

The instant inventors have found that iron seems to be a better catalytic coating than even palladium. That is, while the micro-thin palladium coating greatly enhances the absorption kinetics of the base storage alloy, it does not increase the desorption kinetics as greatly. However, iron increases not only the absorption kinetics but also greatly increases the desorption kinetics as well as reversible desorption capacity. FIG. 8A depicts this increase in reversible desorption capacity. FIG. 8A is a bar graph plot of the amount of hydrogen (in weight percent) desorbed from composite materials produced from the AR031 base alloy (see above) coated with various catalytic coatings on the y-axis, versus a different desorption temperatures on the x-axis. The desorption time is set at four hours in each case. As can be seen, the composite material with the iron coating has the best reversible desorption, i.e. 4.86 weight percent at 250° C. and 2.27 weight percent at 90° C. Furthermore, while iron and palladium are the preferred catalytic material, a broader group comprising iron, palladium, platinum, iridium, gold, and mixtures or alloys thereof is deemed by the inventors to be useful in the instant invention.

Figure 8B:
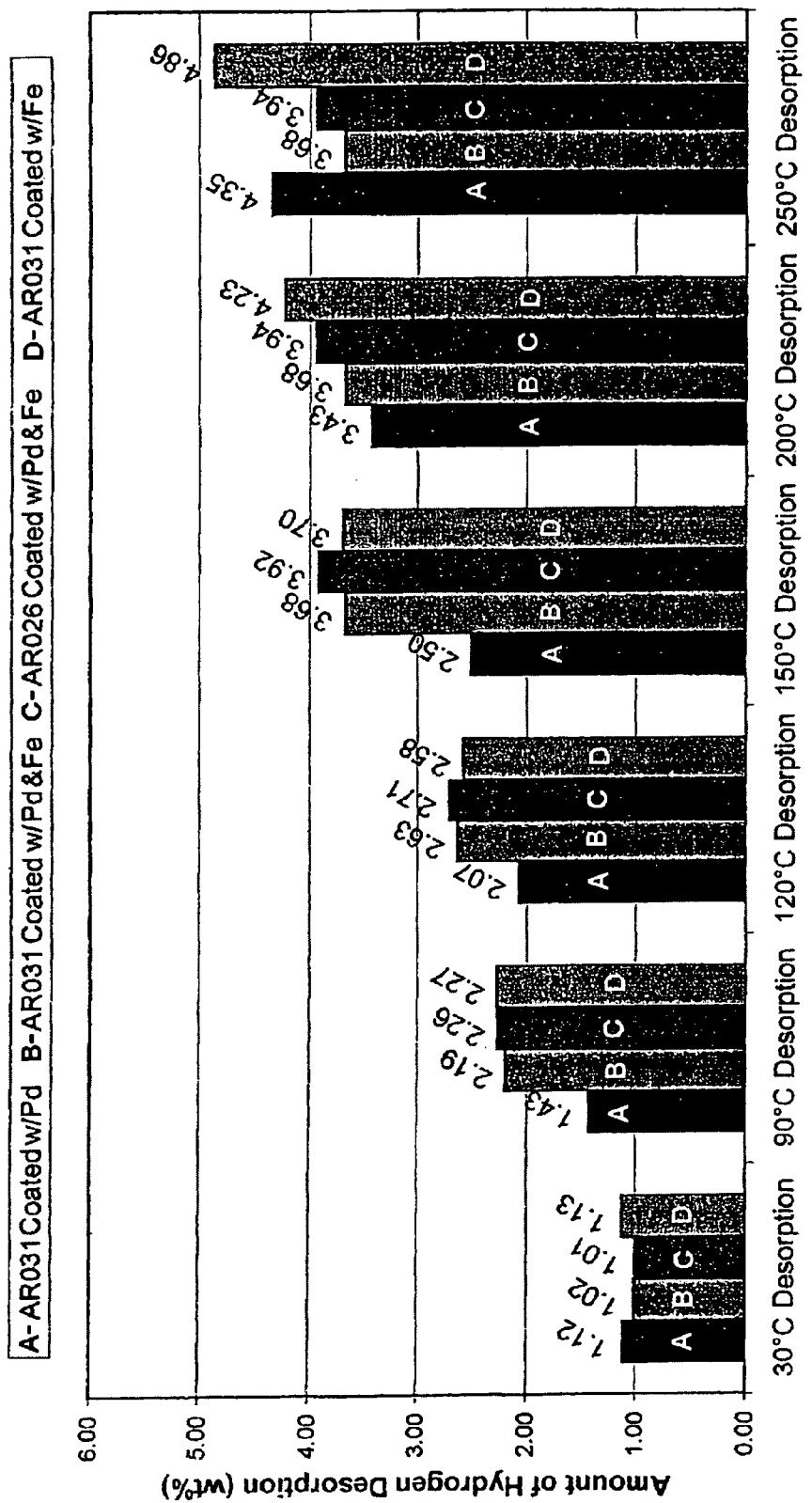

FIG. 8B is a bar graph plot of the amount of hydrogen (in weight percent) desorbed from composite materials produced from either the AR031 base alloy or another alloy AR026 ($Mg_{55}Ni_{36}Mn_6Co_3$) coated with various catalytic coatings on the y-axis, versus a different desorption temperatures on the x-axis. Amazingly, these composite materials can reversibly desorb about 1.0 to 1.1 weight percent hydrogen even at temperatures as low as 30° C. This is unheard of for a magnesium based system, and allows for instant startup of hydrogen powered devices (i.e. fuel cells, hydrogen internal combustion engines, etc.) without the need to instantaneously increase the temperature of the hydride storage material to hundreds of degrees.

The catalytic coating of palladium or iron should be as thin as possible and still produced the desired enhancement of the kinetics of the storage of hydrogen in the base alloy. Preferably the coating is less than about 200 Angstroms and more preferably less than about 150 Angstroms thick and most preferably less than about 100 Angstroms thick. It should be noted that the coated palladium constitutes less than about 0.05% of the composite material and therefore could in no way contribute significantly to the hydrogen storage capacity of the overall material. While, once again, not wishing to be bound by theory, it is believed that the coating acts catalytically to enhance the kinetics of the storage material composite. Also, while the coating was evaporated onto the base alloys of the present invention, it could also have been coated onto the alloys by other techniques such as electroless plating, electrolytic plating or chemical vapor deposition.

Figure 9:
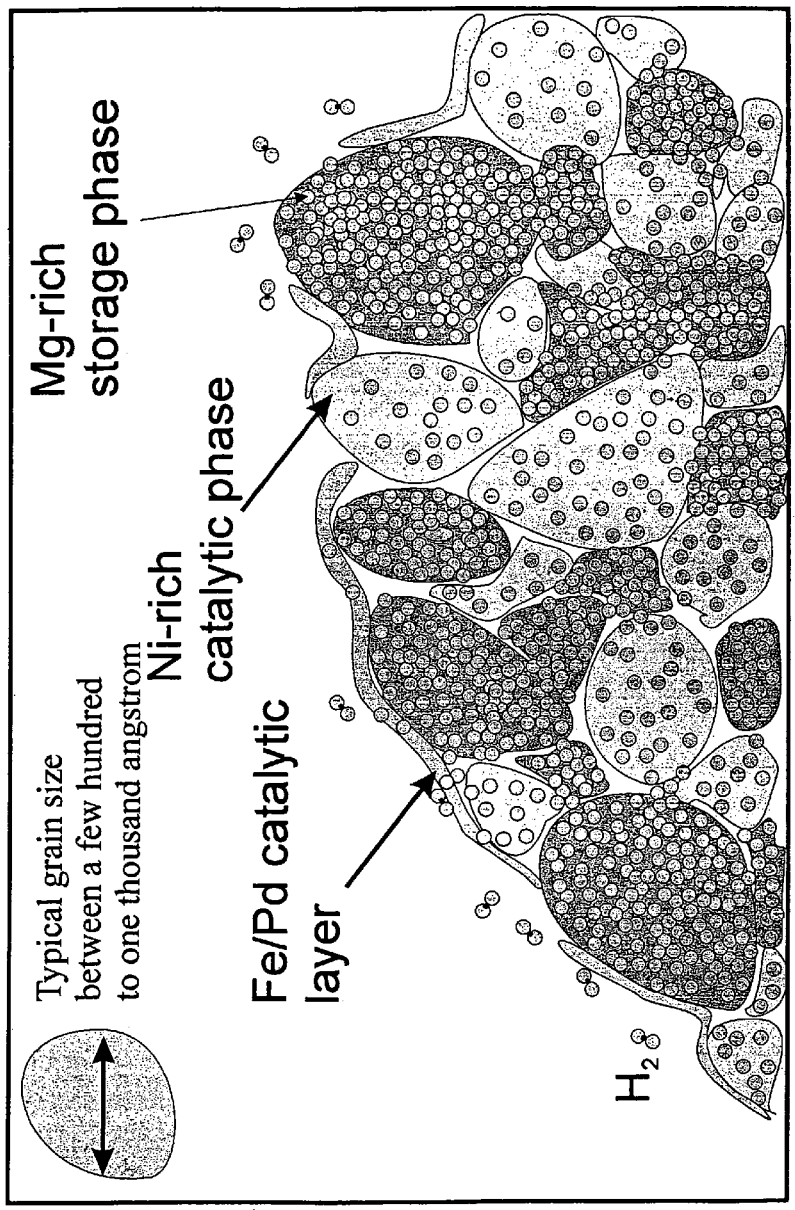
FIG. 9 is an illustrative drawing of the microstructure of a composite material of the instant invention.

It should be noted that the evaporated coating is on the exterior of the pressed bulk sample and does not coat particles on the interior of the bulk. This may not be the most useful way to add the catalytic coating. FIG. 9 is an illustrative drawing of the microstructure of a composite material of the instant invention as envisioned by the inventors. The bulk base alloy consists of magnesium rich hydrogen storage phases intermixed with nickel rich catalytic phases. On the surface of bulk material is an ultra-thin coating of the added catalytic material (i.e. Pd or Fe, ect.). The ultra-thin coating is most likely not contiguous and is not to scale in this illustrative depiction. In fact, cross-sectional SEM photomicrographs do not show the 100–200 Angstrom catalytic coating at all.

As alluded to above, the present method of adding the catalytic material layer (evaporation onto the exterior of a pressed bulk base alloy) may not be the best method of adding such catalytic material to the composite. The inventors envision that in addition to coating techniques, other techniques may be used to add catalytic material to the bulk base alloy. For instance, the inventors believe that the addition of catalytic particles, such as catalytic iron nanoparticles, to the base alloy during the last minutes of mechanical alloying may embed the particles into the surface of the particles of the base alloy. The particulate coated base alloy may then be sintered causing the iron particles to be distributed throughout the bulk of the composite material. Finally, the inventors theorize that some combination of catalytic coating and distributed catalytic particles may be the best form for the composite materials of the present invention.

Figure 10:
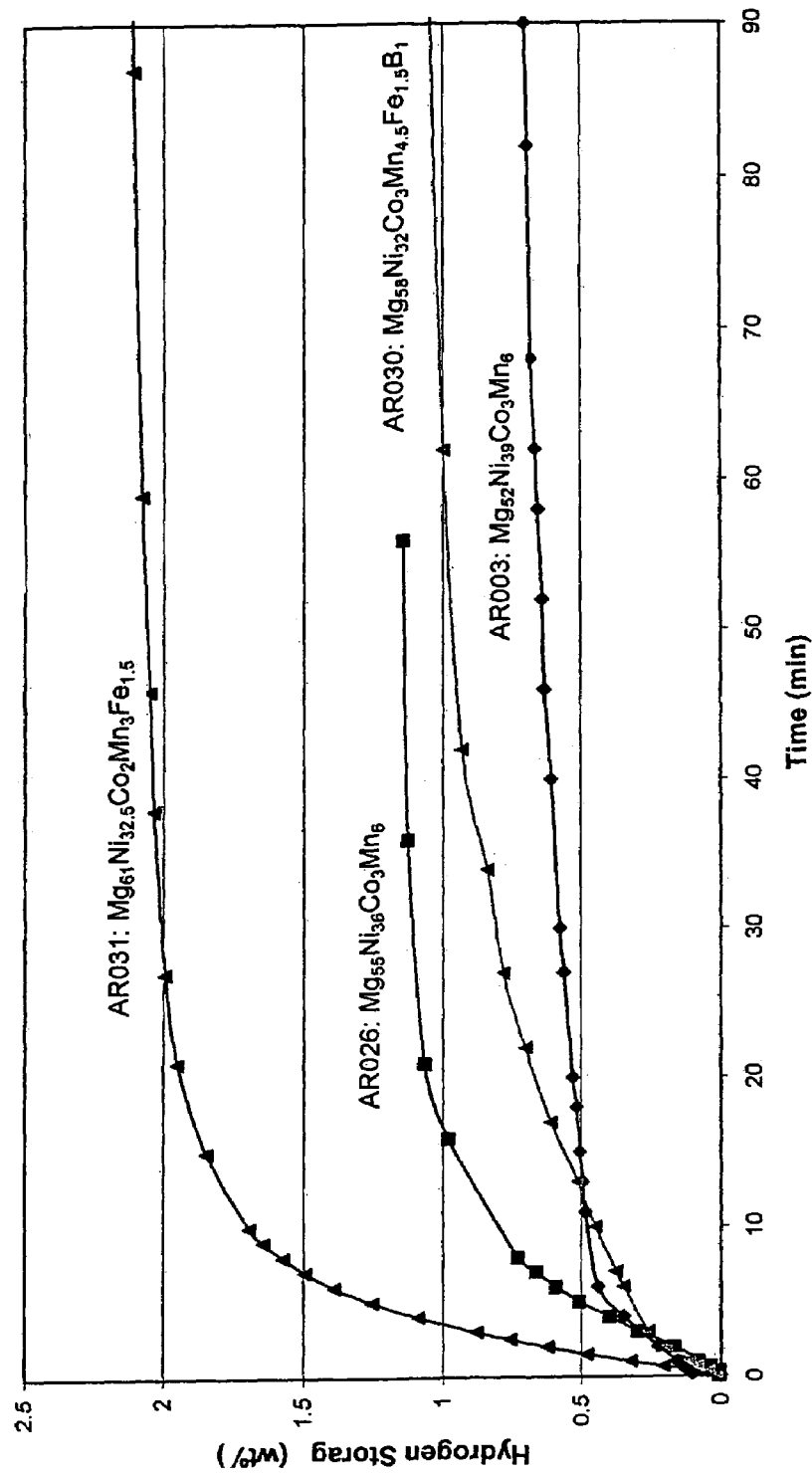
FIG. 10 plots the amount of hydrogen abortion in the first 90 minutes for composite materials using the base alloys AR003 (52% Mg), AR026 (55% Mg), AR030 (58% Mg), and AR031 (Mg61%)
Figure 11:
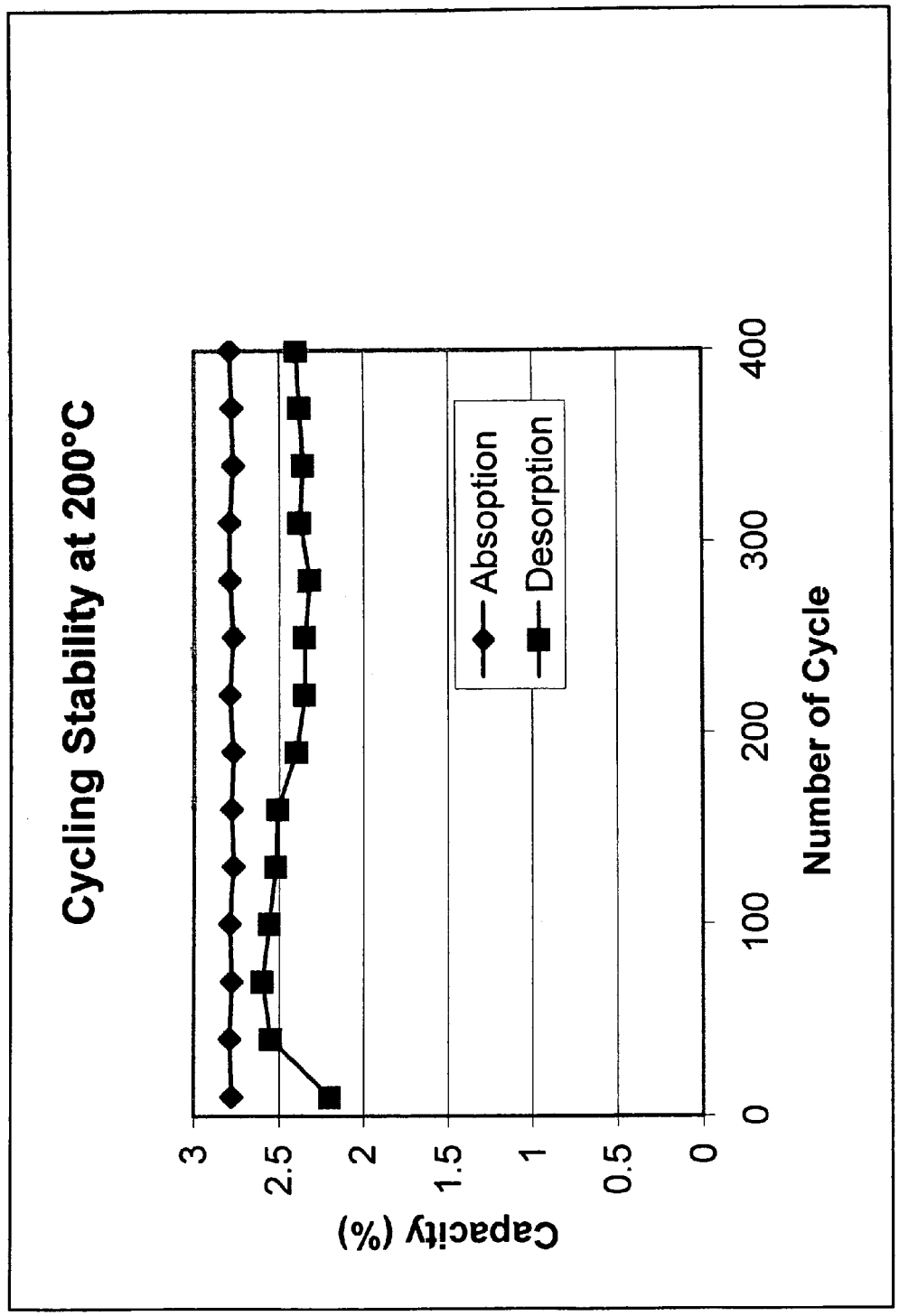
FIG. 11 shows the results of cycling a composite material of the instant invention at 200° C., and specifically plots the absorption and desorption capacities versus cycle number.

The amount of hydrogen abortion in the first 90 minutes were recorded for AR003 (52% Mg), AR026 (55% Mg), AR030 (58% Mg), and AR031 (Mg61%) and plotted in FIG. 10. The observed trend is that as the magnesium content increases, the total storage capacity also increases. However, the absorption rate decreases as metal-to-hydrogen bond strength increases with the high Mg content. Therefore, a balance between the amount of hydride former (Mg, for example) and modifier (Ni, Co, etc.) is very important for the general material performance, as well as the proper distribution of these components A mechanically alloyed sample of material having the base alloy composition designated AR26 was produced by a two hour grinding with heptane and graphite grinding aids. The base alloy was pressed into an expanded metal substrate and then was coated with 100 angstrom of Fe on both sides. The sample was put into a PCT measurement apparatus and both the hydrogen adsorption and desorption capacity at 200° C. were measured as a function of cycle number. The results of cycling at 200° C. are shown in FIG. 11 which plots the absorption and desorption capacities versus cycle number. From the data, it can be seen that the absorption capacity was not changed (2.8%) while desorption capacity dropped slightly from a maximum of 2.6% to 2.4% after 400 cycles. The 200° C. cycling temperature was chosen to hasten the experimental measurements and does not reflect a restriction of the useful temperature range for the tested sample.

Figure 12:
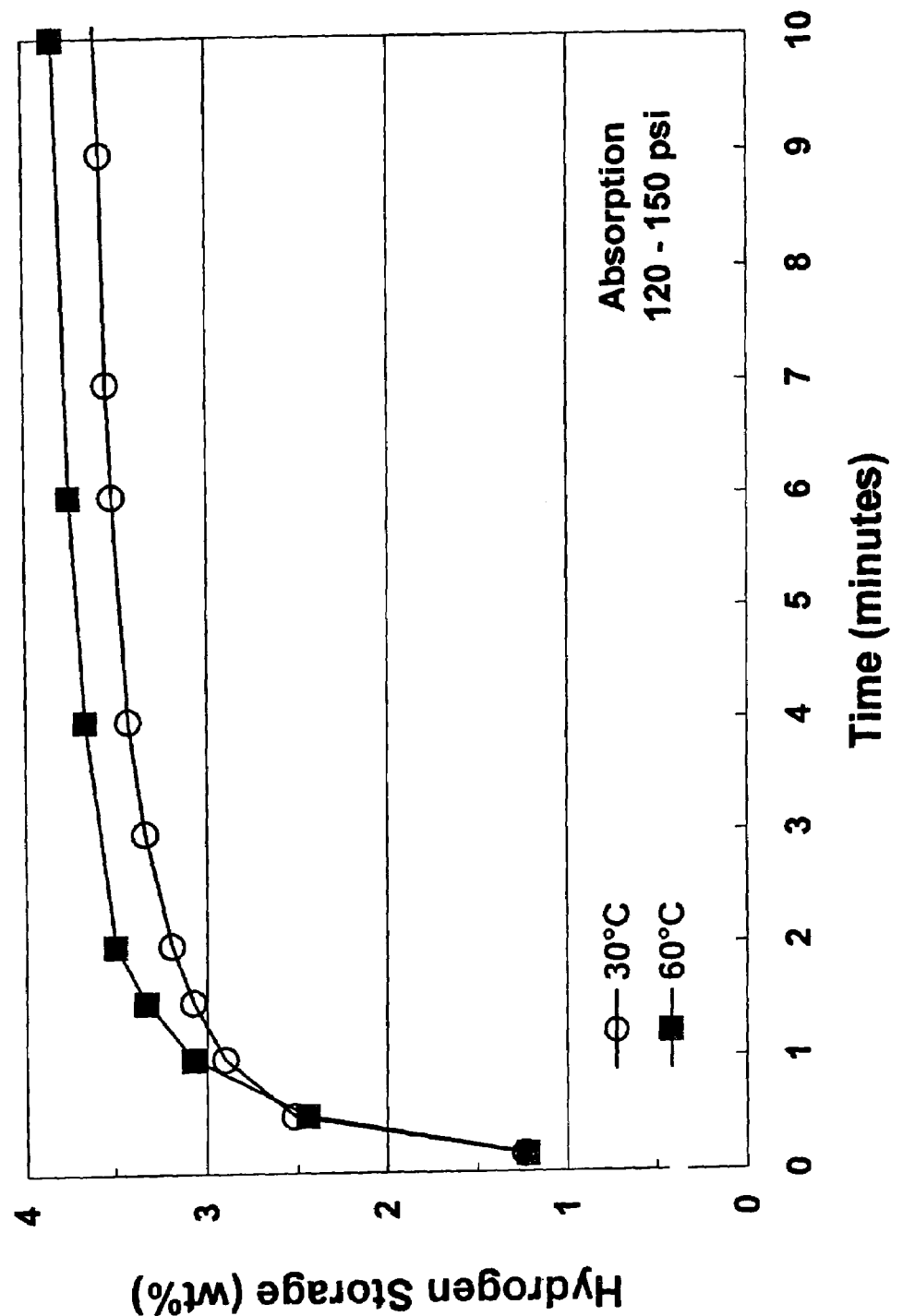
FIG. 12 shows absorption curves for a composite material of the instant invention having a base alloy composition of $Mg_{52}Ni_{39}Mn_6CO_3$ with a 100 Angstrom palladium coating thereon at 30° C. and 60° C.
Figure 13:
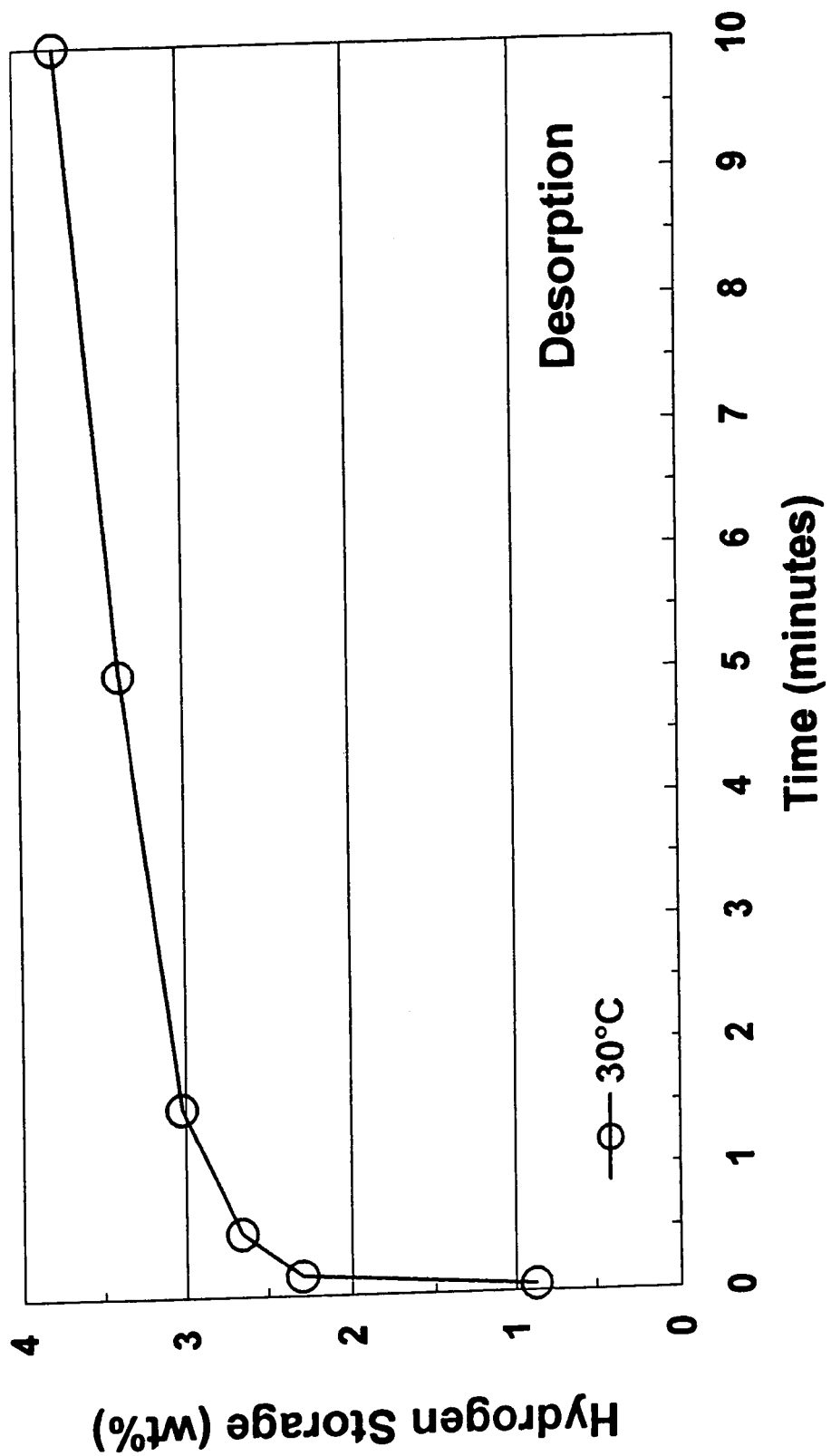
FIG. 13 shows the desorption curves for the same material as in FIG. 12.

As alluded to above, the instant composite materials have very good low temperature kinetics. FIG. 12 shows absorption curves for a composite material of the instant invention having a base alloy composition of $Mg_{52}Ni_{39}Mn_6Co_3$ with a 100 Angstrom palladium coating thereon at 30° C. (reference symbol ○) and 60° C. (reference symbol ■). The hydrogen absorption occurred at a pressure of 120–150 psi. As can be seen from these curves, this material has very good kinetics (absorbing the majority of the hydrogen in a matter of minutes) at relatively low temperatures and pressures. That is, this composite material can absorb 3 weight percent hydrogen in less than two minutes and 3.5 weight percent hydrogen in less than 10 minutes at 30° C. These are fantastic results which have heretofore never been seen in the prior art. FIG. 13 shows the desorption curves for the same alloy as in FIG. 8. This figure shows that the material can desorb the stored hydrogen within a matter of minutes at 30° C.

Figure 14:
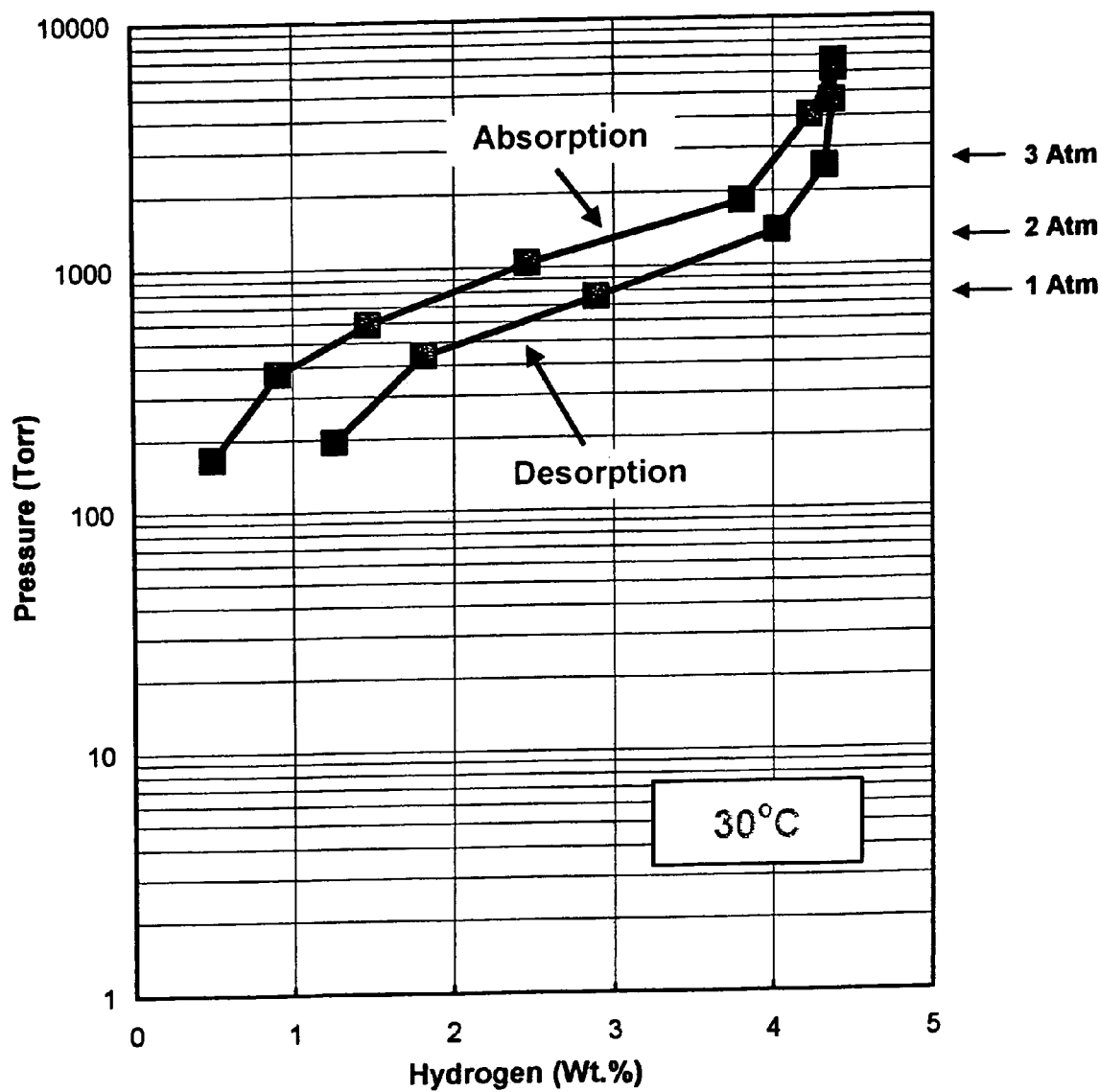
FIGS. 14 and 15 depict the PCT curves for adsorption and desorption of hydrogen for the material of FIGS. 12 and 13 at 30° C. and 50° C., respectively, specifically these figures show that the hysteresis between the hydrogen adsorption and desorption is low.
Figure 15:
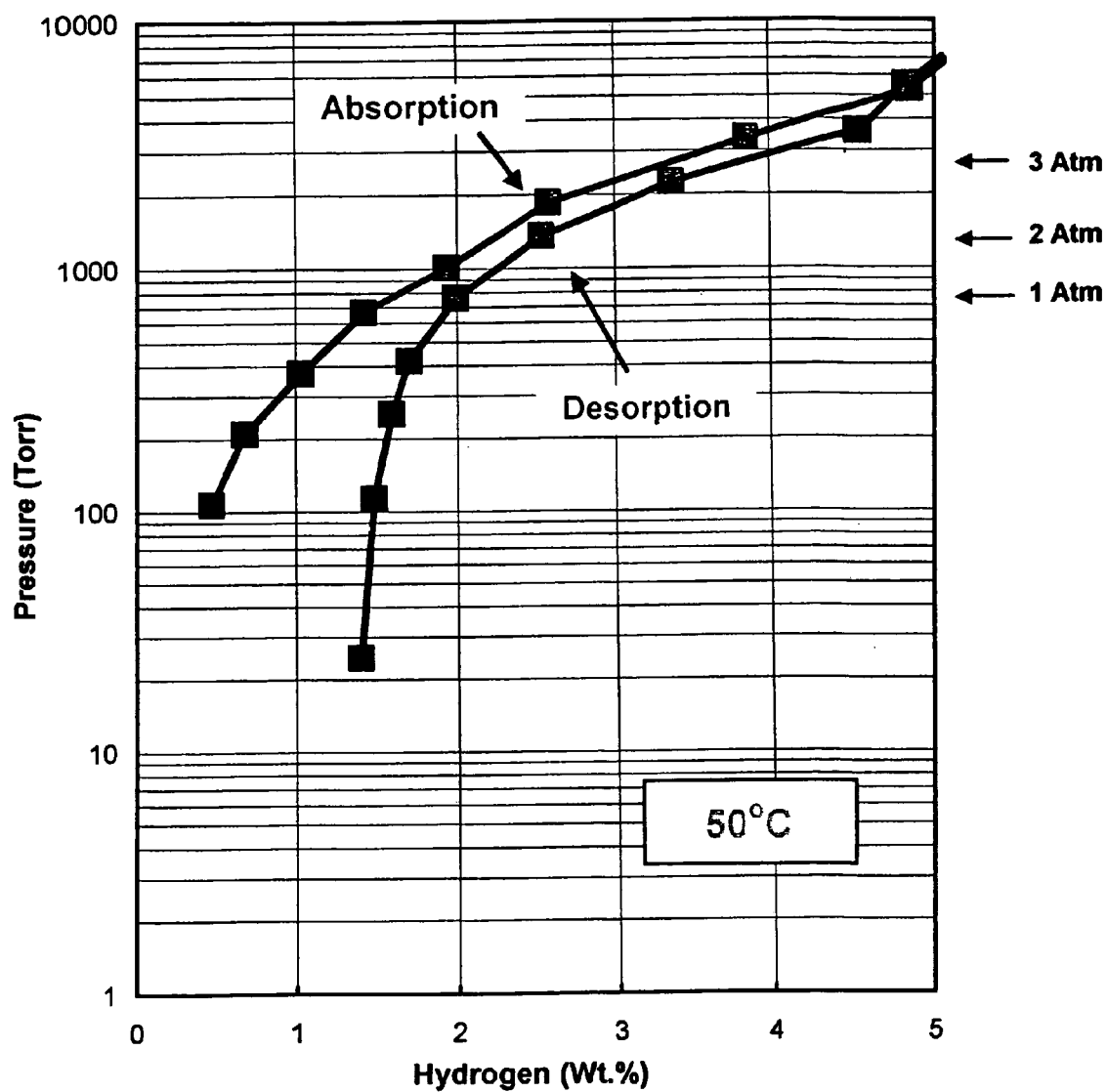

FIGS. 14 and 15 depict the PCT curves for adsorption and desorption of hydrogen for the material of FIGS. 12 and 13 at 30° C. and 50° C., respectively. Perusal of these figures shows that the hysteresis between the hydrogen adsorption and desorption is low. This can be seen by comparing the pressure differential between the adsorption and desorption curves of the PCT plots at the midpoint of the composition range. The midpoint is the point at about half of the maximum hydrogen storage capacity.

Figure 16:
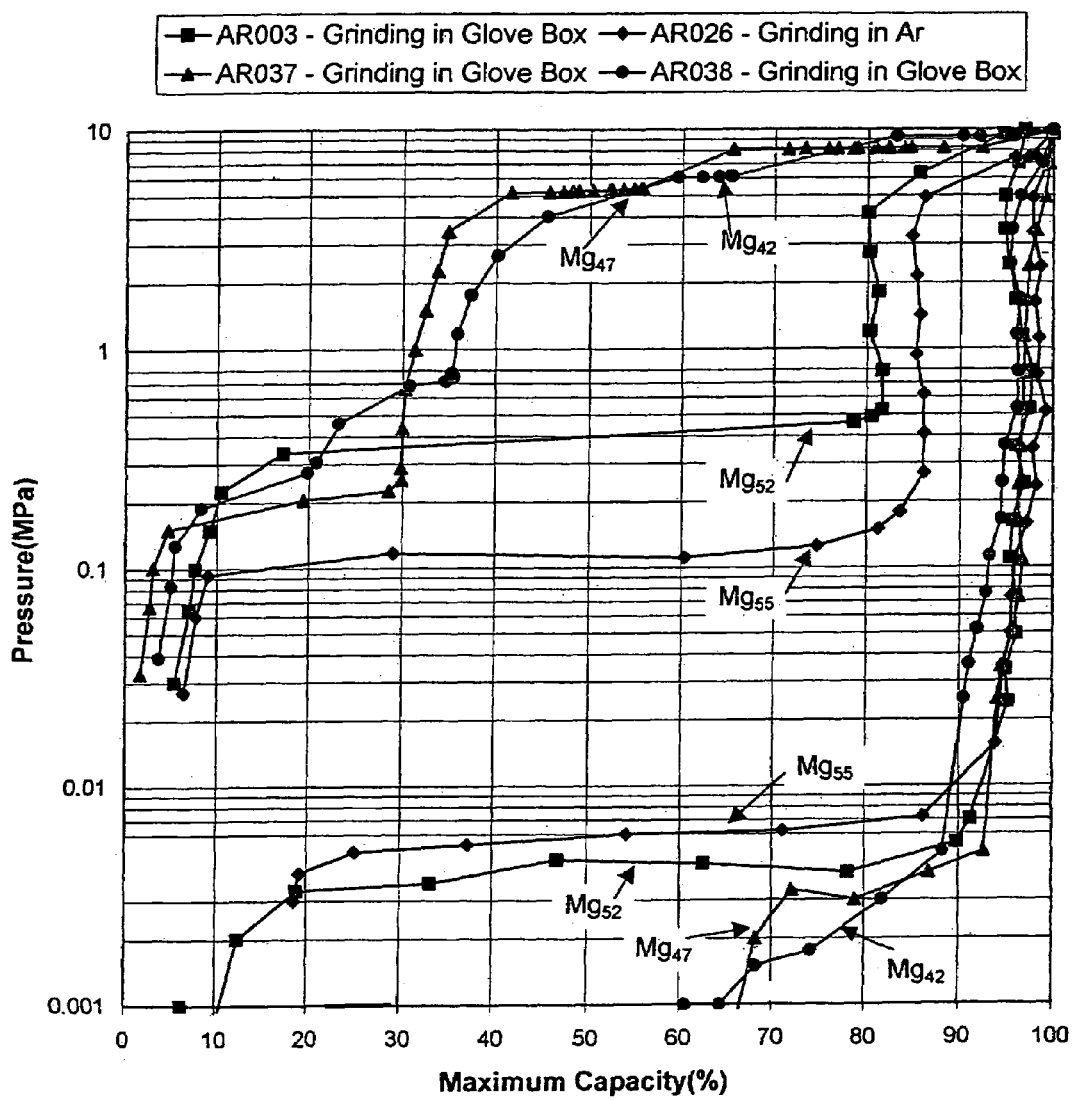
FIG. 16 plots the absorption and desorption pressures of various composite materials of the present invention versus hydrogen content (PCT) measured at 200° C.
Figure 17:
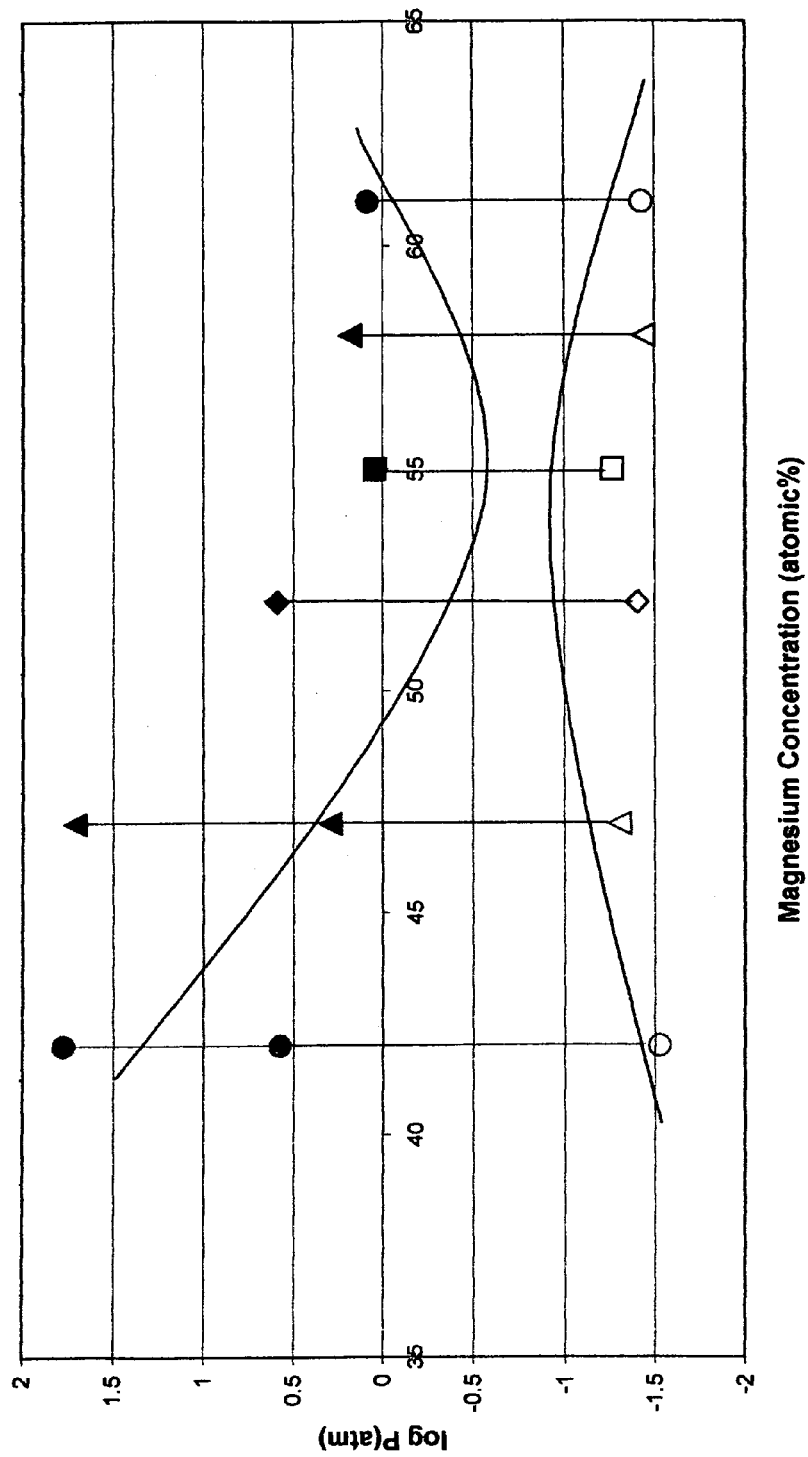
FIG. 17 plots the absorption and desorption plateau pressures as a function of Mg content of the base alloy for the various composite materials of FIG. 16.

A series of compositions with Mg contents varying from 42 to 62 atomic % were prepared. The PCT measured at 200° C. for some of the alloys is plotted in FIG. 16. The plot shows absorption and desorption plateau pressures. The plateau pressure hysterisis is large compared to other hydrogen storage materials as Lavas phases based $AB_2$, or $CaCu_5$-structure $AB_5$ materials. FIG. 17 plots the absorption and desorption plateau pressures as a function of Mg content of the base alloy for the various composite materials of FIG. 16. This plot indicates that there is an optimal Mg content at around 55% at which the absorption-desorption hystersis is minimized.

Figure 18:
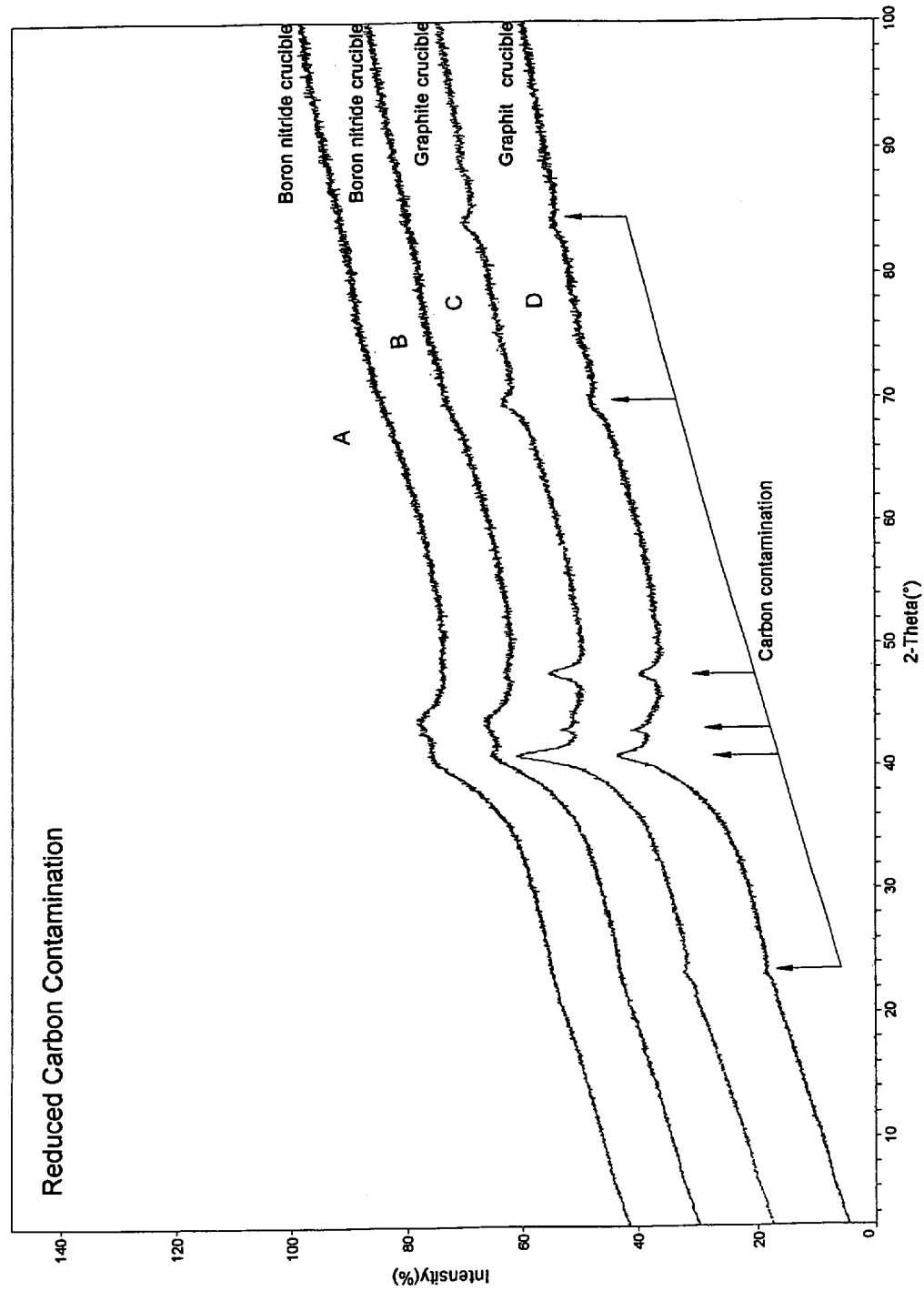
FIG. 18 is an x-ray diffraction graph of base alloy materials of the instant invention and specifically shows how use of a graphite crucible introduces deleterious carbon contaminants into the alloy material.

In addition to the specifics on the melt quenching, the composition of the crucible in which the alloy is melted is important. FIG. 18 is an x-ray diffraction graph of materials of the instant invention and specifically shows how use of a graphite crucible (curves C and D) introduces carbon contaminants into the alloy material. The carbon forms carbides which cannot be made amorphous by mechanical alloying. However, the use of boron nitride crucibles produces contaminants which can be made amorphous by mechanical alloying (see curves A and B). The carbon contaminant is a "malignant" contaminant and as such negatively influences the properties of the composite material, whereas the boron nitride is a "benign" contaminant and does not adversely influence the properties of the hydrogen storage composite. Carbon enters the alloy and takes hydrogen sites and as such the reduction/elimination of carbon contamination allows for the production of materials which have the storage capacity and kinetics of the instant invention.

The magnetic susceptibility of samples having compositions designated as AR003, AR026, and AR031, which were prepared by grinding with and without the addition of graphite and heptane grinding aids were measured. In both cases, grinding time was two hours. The susceptibility results data was used to determine the free nickel content percentage of the samples. The free nickel content of the samples is listed in Table II. Samples ground with graphite and heptane grinding aids showed higher percentage of free nickel, which contributed to a more catalytic surface, thereby helping hydrogen absorption.

Figure 19:
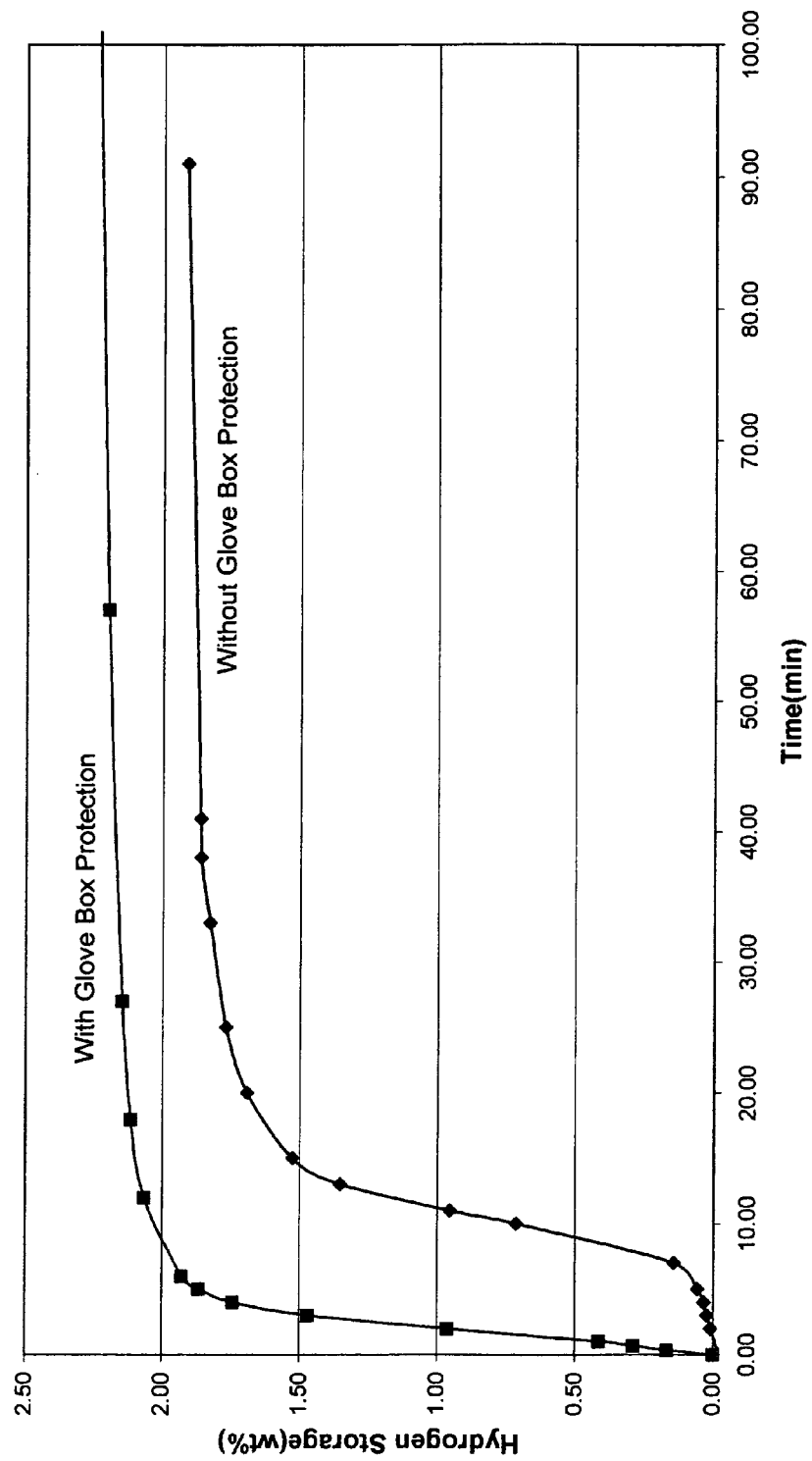
FIG. 19 plots hydrogen absorption versus time (hydrogen absorption rates) for sample composite materials of the instant invention which were prepared with and without glove box protection (i.e. protection from oxygen contamination)

In the inventors' original attritor setup, an overpressure of argon was maintained in the attritor container throughout the entire mechanical alloying process. Small amount of argon leaked out from the collar holding the rotating shaft of the attritor. The inventors believed that there might have been some air back-streaming into the attritor as a result of this leakage. In an attempt to reduce possible oxygen contamination, the inventors constructed a glove box around the attritor and filled the glove box with an argon atmosphere to protect the attritor. The hydrogen absorption rates for samples prepared with and without glove box protection are shown in FIG. 19. It can be seen that this added protection was successful in reducing the oxygen contamination of the mechanically alloyed materials. With reduction in oxygen contamination, not only did the total storage capacity increase, but the storage kinetics also increased. The calculated surface reaction and bulk diffusion constant for the two samples are listed in Table III. While the bulk diffusion constant improved by a factor two with the reduction of oxygen contamination, the surface hydrogenation kinetics increased by as much as seven times. This clearly illustrates the importance of oxygen control during processing.

Figure 20:
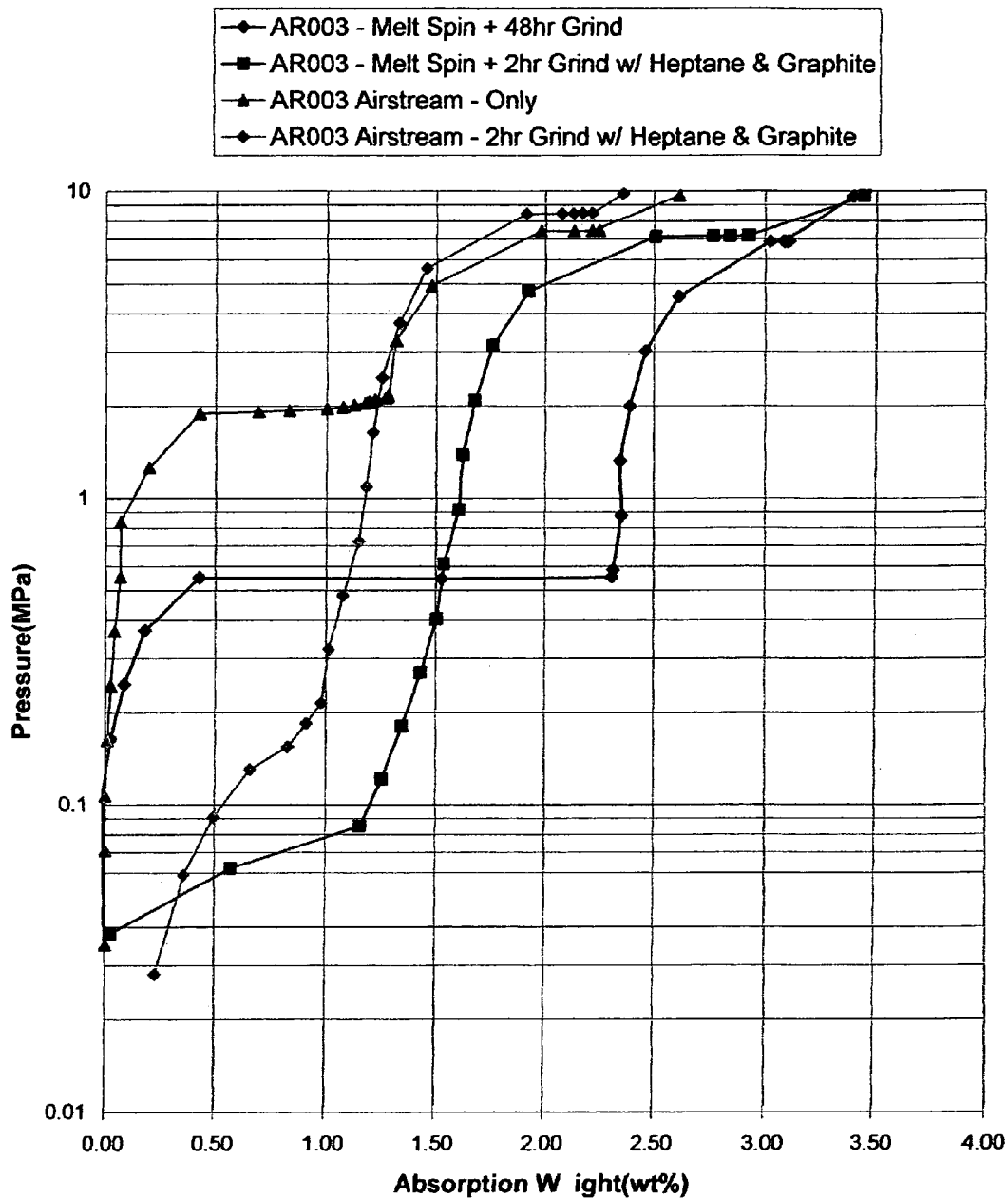
FIG. 20 plots the PCT curves at 90° C. of composite materials having a base alloy of AR003 produced by various alloy grinding techniques.

In an attempt to reduce the grinding time required to make the base alloy powder of the instant invention and thereby the associated cost of production, the inventors used an air stream crushing technique to break up the ribbons of the hydrogen storage alloy. The technique used a high speed air stream impinging upon coarse powder sitting in a cyclone-like container, the powder was pulverized by crushing against each other and the powder was collected from the container through a sieve. The temperature of the impinging air stream is at least 5 to 10° C. lower than environment due to the expansion of the pressurized gas stream. The powder thus obtained was labeled as the air stream sample. A portion of the air stream sample powder was fed into the attritor and ground for two hours with heptane and graphite grinding aids. The PCT curves at 90° C. are plotted in FIG. 20. A small degradation in the hydrogen capacity is observed on air stream sample due to oxygen in the air used. The inventors believe that the results will be improved if a protective atmosphere such as argon or nitrogen is used instead of air.

Figure 21:
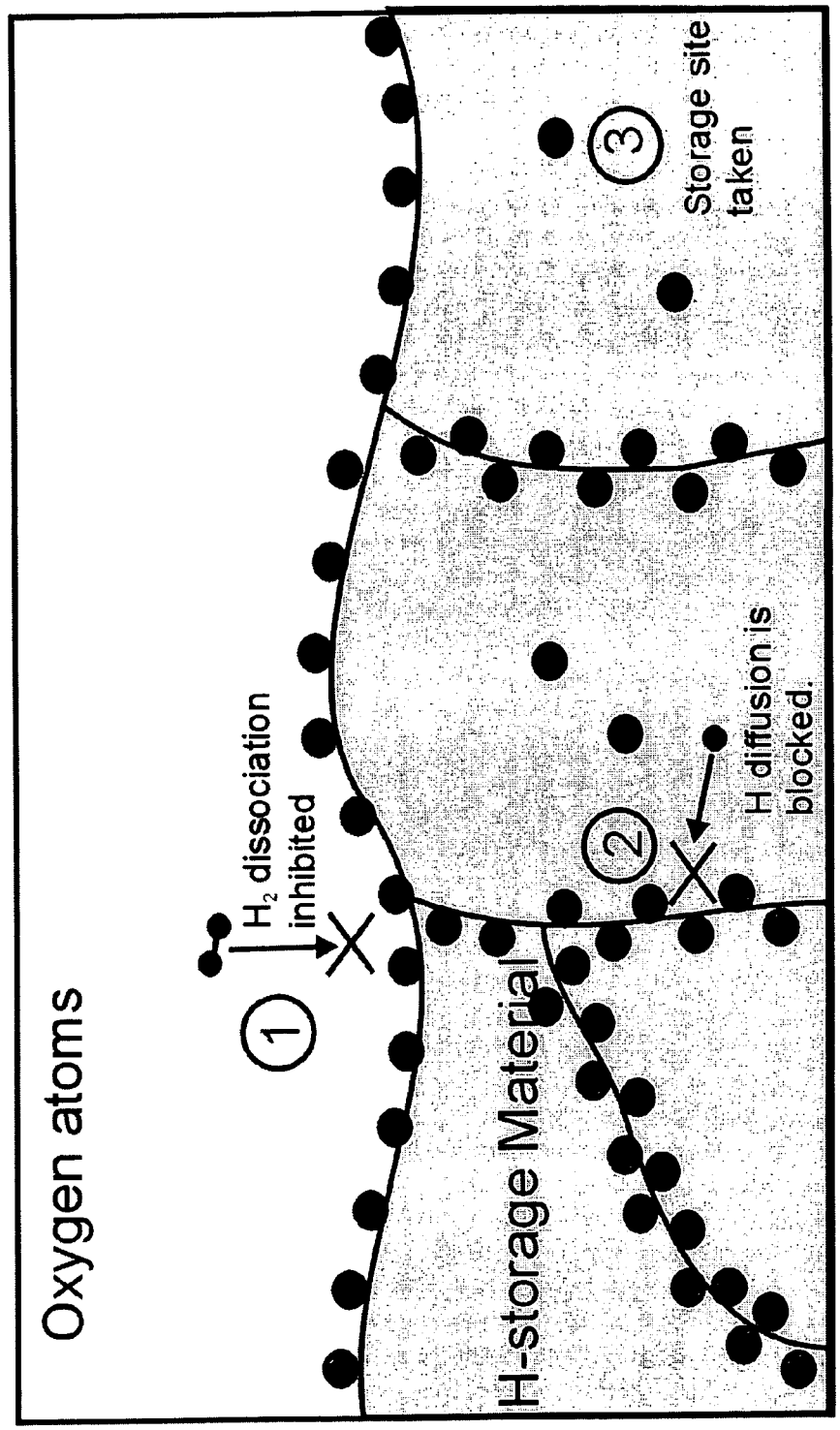
FIG. 21 depicts a schematic representation of the surface of a composite material of the present invention, and specifically illustrates the possible detrimental effects of oxygen contamination therein.

The possible detrimental effects of oxygen contamination are illustrated in FIG. 21, which depicts a schematic representation of the surface of a composite material of the present invention. The surface oxide formed during powder processing, storage, or transportation will hinder the hydrogen absorption through surface catalysis (region 1 in FIG. 21). It will also obstruct hydrogen atoms from recombining into hydrogen molecules at the surface during hydrogen desorption. The second affected area is in the grain boundary (as shown in region 2 in FIG. 21). The relatively large size and electron affinity of the oxygen ion in the grain boundary will stop hydrogen diffusion through the dangling bonds in the grain boundary area and thus reduce the bulk diffusion of hydrogen. Both the desorption and absorption kinetics will be diminished substantially. The third negative effect of oxygen is in the bulk region where useful hydrogen storage site are occupied or interfered with by negatively charged oxygen. Therefore the reversible storage capacity of hydrogen will be reduced (region 3 in FIG. 21).

One additional aspect of the present invention which has not been fully discussed, but which is very important, is the equilibrium pressures of the present composite hydrogen storage materials. The pressures used to adsorb the hydrogen into the materials of the present invention are less than 150 PSI. Most of the hydrogen can be adsorbed into the materials at less than about 50 PSI. In contrast, most other work on high capacity Mg based hydrogen storage materials require pressures in the range of 1000–5000 PSI. With this greatly lowered pressure requirement, the requirements for the materials of construction for hydrogen storage beds and like systems is greatly reduced. Thus at 50–150 PSI, light weight simple construction materials may be used (for example rubber tubing as opposed to quarter inch stainless steel tubing may be used) whereas in the range of 1000–5000 PSI, more expensive and exotic materials must be used. This reduction in cost and complexity of related systems and materials of construction are an added benefit of the composite materials of the instant invention.

Figure 22:
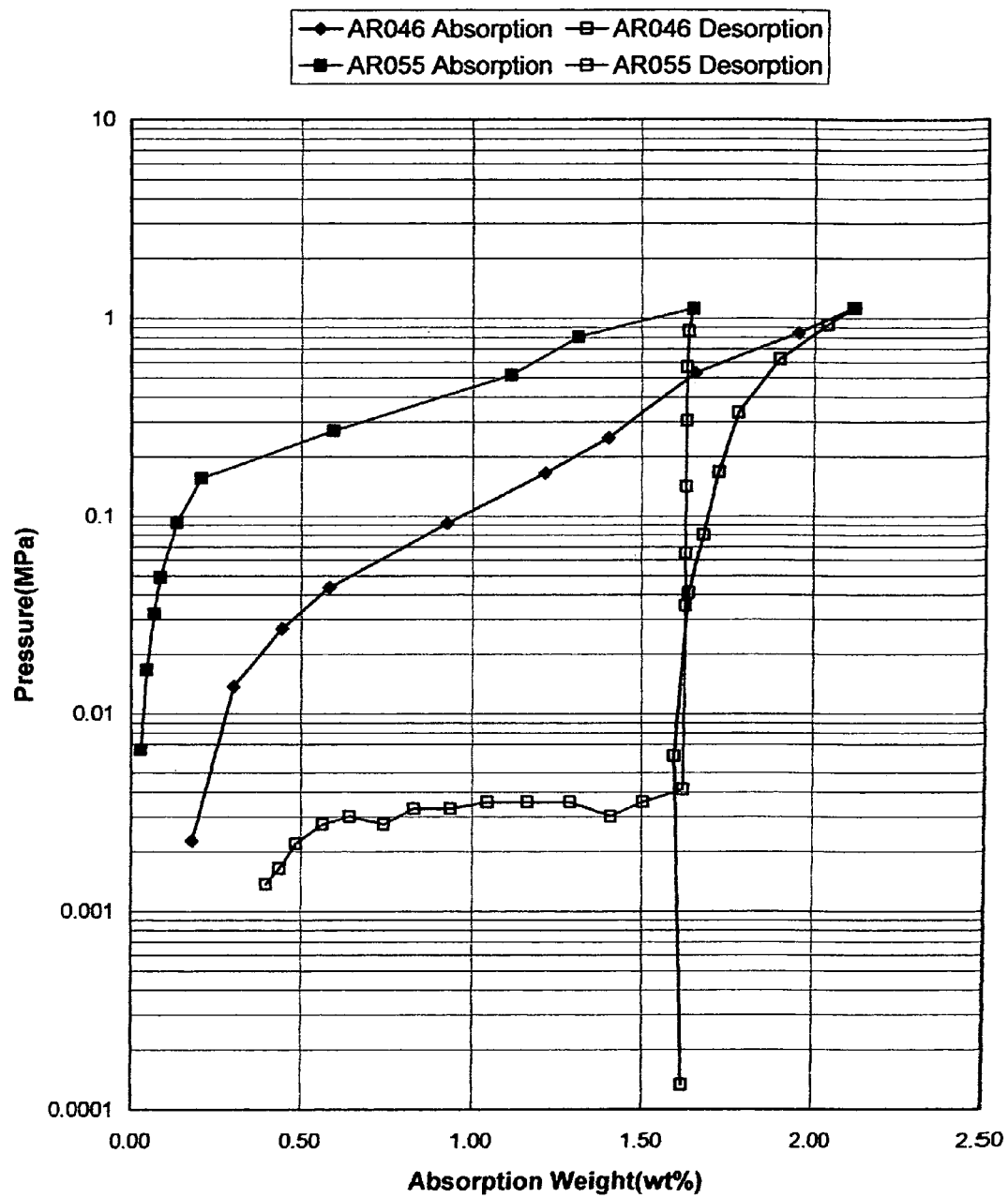
FIG. 22 is a plot of PCT absorption and desorption curves at 90° C. for a composite material of the instant invention having a base alloy of AR046 and for another composite material of the instant invention formed from a AR046 base alloy in which 2 at. % silver was partially substituted for nickel in the base alloy (designated AR055), specifically the silver substituted base alloy exhibits improved hydrogen desorption at 90° C.

One element proven to have positive contribution toward hydrogen desorption is silver. When 2 at. % silver was partially substituted for nickel in the base alloy designated AR046, the resulting alloy (designated AR055) exhibits improved hydrogen desorption at 90° C. as can be seen from two PCT curves illustrated in FIG. 22. This sample had a desorption plateau pressure of around 0.003 MPa. It is believed that the relatively large atomic size of silver may contribute greatly to disorder of the polycrystalline sample and make the absorbed hydrogen easier to remove from the lattice.

Figure 23:
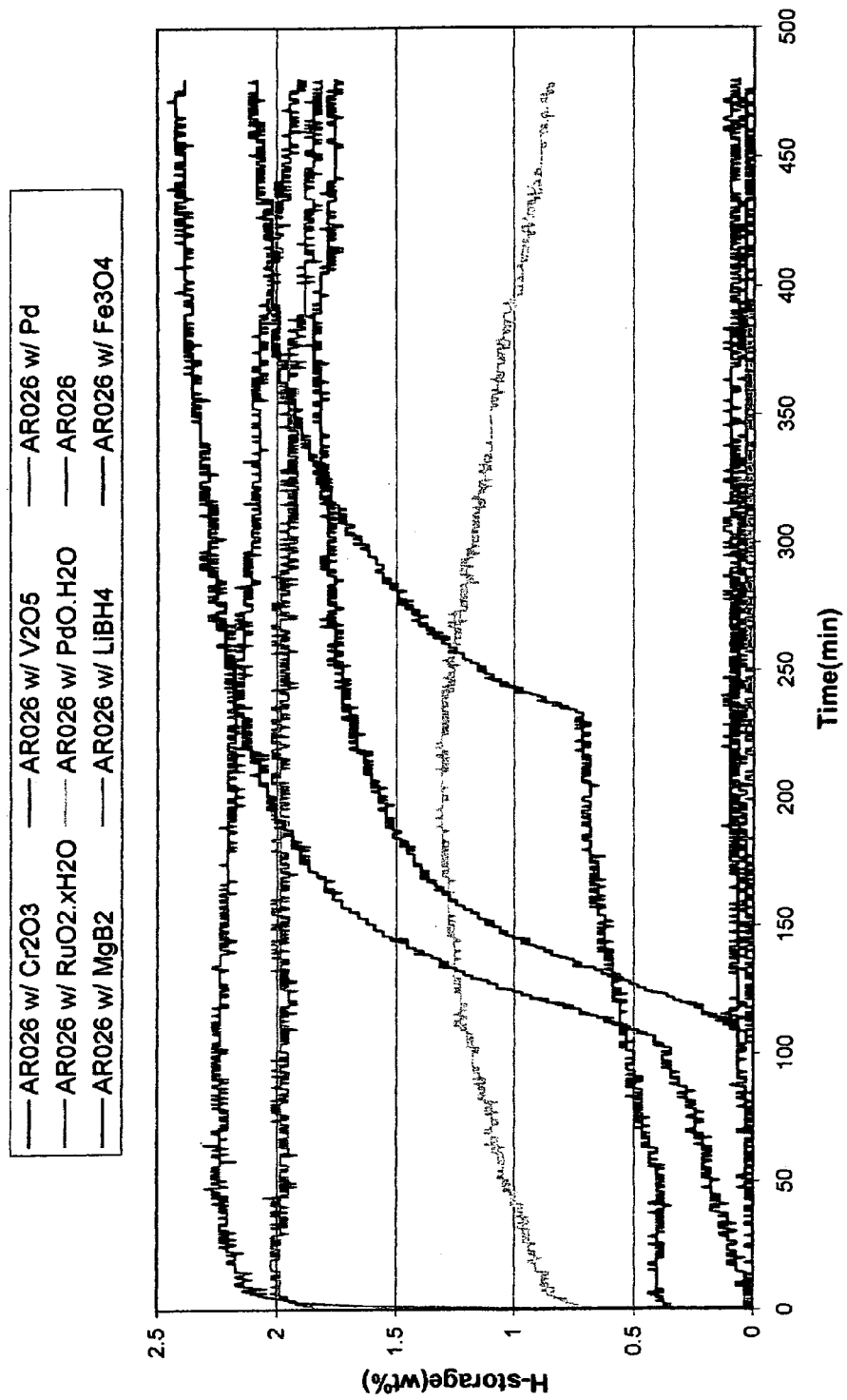
FIG. 23 plots the hydrogen absorption versus time (the absorption rate) for various additives added to composite materials of the instant invention produced with AR0025 base alloys.

In an attempt to improve the hydrogen absorption rate of AR025 materials, small amounts of additives (1.5 to 2. wt. %) were added to the base alloy material by a shaker milling method. These catalyst candidates include $Cr_2O_3$, $V_2O_5$, Pd, $RuO_2.xH_2O$, $PdO.xH_2O$, $MgB_2$, $LiBH_4$, and $Fe_3O_4$. The shaker mill was run for 30 minutes to ensure through mixing of the AR026 powder with the additives. The resulting mixture was pressed into an expanded metal substrate and tested in the gas phase reactor. The hydrogen absorption vs. time (absorption rate) for each additive are plotted in FIG. 23. From FIG. 23, it can be concluded that both Pd and $RuO_2.xH_2O$ improve hydrogen absorption kinetics substantially while maintain high storage capacity. The $PdO.xH_2O$ also improves the absorption kinetics but slightly reduces to the total storage capacity.

Another potential application of these Mg-based hydrogen storage composite materials outside of gas phase storage of hydrogen is in nickel-metal hydride batteries (Ni-MH). A half-cell test configuration was constructed using AR034 as the negative electrode and a partially precharged sintered $Ni(OH)_2$ electrode as the counter electrode. The system was charged at a rate of 100 mA/g for 12 hour (total capacity input was 1200 mAh/g). Then the system was discharged and the total discharge capacity at the third cycle was 692 mAh/g, which is equivalent to a gas phase hydrogen reversible storage capacity of 2.58%. Thus the electrochemical measurement confirmed the high hydrogen storage potential that was observed from the gas phase measurements.

The drawings, discussion, descriptions, and examples of this specification are merely illustrative of particular embodiments of the invention and are not meant as limitations upon its practice. It is the following claims, including all equivalents, that define the scope of the invention.

TABLE 1

| | In Atomic Percent | | | | | | | | | | |
|---|---|---|---|---|---|---|---|---|---|---|---|
| Alloy # | Mg | Ni | Co | Mn | Fe | Al | Zr | Cu | Zn | Ag | B | Other |
| AR1 | 52 | 45 | 3 | — | — | — | — | — | — | — | — | — |
| AR3 | 52 | 39 | 3 | 6 | — | — | — | — | — | — | — | — |
| AR4 | 51.5 | 37 | 6 | 4 | 1.5 | — | — | — | — | — | — | — |

TABLE 1-continued

In Atomic Percent

| Alloy # | Mg | Ni | Co | Mn | Fe | Al | Zr | Cu | Zn | Ag | B | Other |
|---|---|---|---|---|---|---|---|---|---|---|---|---|
| AR5 | 50 | 40 | 6 | 3 | — | — | 1 | — | — | — | — | — |
| AR6 | 51.5 | 37 | 3 | 4 | 1.5 | 3 | — | — | — | — | — | — |
| AR7 | 51.5 | 37 | 6 | 4 | — | — | — | 1.5 | — | — | — | — |
| AR8 | 51.5 | 37 | 4 | 4 | — | 2 | — | 1.5 | — | — | — | — |
| AR9 | 51.5 | 37 | 4 | 4 | — | 2.5 | 1 | — | — | — | — | — |
| AR10 | 51.5 | 37 | 4 | 3 | 1.5 | 2 | — | 1 | — | — | — | — |
| AR11 | 51.5 | 37 | 3 | 3 | 1 | 2 | 1 | 1.5 | — | — | — | — |
| AR12 | 51.5 | 37 | 3 | 3 | 1 | 2 | — | 1.5 | 1 | — | — | — |
| AR13 | 51.5 | 37 | 3 | 3 | 1.5 | 3 | — | — | 1 | — | — | — |
| AR14 | 51.5 | 37 | 3 | 3 | 1 | 2 | 1 | — | 1.5 | — | — | — |
| AR15 | 51.5 | 36 | 3 | 3 | 1 | 2 | 1 | 1.5 | 1 | — | — | — |
| AR16 | 51.5 | 36 | 4 | 4 | 1.5 | — | — | — | — | — | 1 | — |
| AR17 | 51.5 | 37 | 3 | 3 | 1.5 | 3 | — | — | — | — | 1 | — |
| AR18 | 51.5 | 35 | 4 | 4 | 1.5 | — | — | — | — | — | 2 | — |
| AR19 | 50 | 35 | 4 | 4 | 3 | 5 | — | — | — | — | — | — |
| AR20 | 50 | 38 | 6 | 6 | — | — | — | — | — | — | — | 3% -La |
| AR21 | 50 | 38 | 6 | 6 | — | — | — | — | — | — | — | 3% -Ru |
| AR22 | 50 | 38 | 6 | 6 | — | — | — | — | — | — | — | 3% -Re |
| AR23 | 51.5 | 33.5 | 4 | 4 | — | — | — | 5 | — | — | — | — |
| AR24 | 51.5 | 28.5 | 4 | 4 | — | — | — | 10 | — | — | — | — |
| AR25 | 51.5 | 28.5 | 4 | 4 | 3 | — | — | 10 | — | — | — | — |
| AR26 | 55 | 36 | 3 | 6 | — | — | — | — | — | — | — | — |
| AR27 | 58 | 33 | 3 | 6 | — | — | — | — | — | — | — | — |
| AR28 | 55 | 36 | 3 | 4.5 | 1.5 | — | — | — | — | — | — | — |
| AR29 | 55 | 35 | 3 | 4.5 | 1.5 | — | — | — | — | — | 1 | — |
| AR30 | 58 | 32 | 3 | 4.5 | 1.5 | — | — | — | — | — | 1 | — |
| AR31 | 61 | 32.5 | 2 | 3 | 1.5 | — | — | — | — | — | — | — |
| AR32 | 61 | 30 | 2 | 4.5 | 1.5 | — | — | — | — | — | 1 | — |
| AR33 | 55 | 30 | 3 | 12 | — | — | — | — | — | — | — | — |
| AR34 | 55 | 24 | 3 | 18 | — | — | — | — | — | — | — | — |
| AR35 | 55 | 29 | 10 | 6 | — | — | — | — | — | — | — | — |
| AR36 | 55 | 23 | 16 | 6 | — | — | — | — | — | — | — | — |
| AR37 | 47 | 44 | 3 | 6 | — | — | — | — | — | — | — | — |
| AR38 | 42 | 49 | 3 | 6 | — | — | — | — | — | — | — | — |
| AR39 | 51.4 | 38.6 | 3 | 6 | — | — | — | — | — | — | — | 1% -Li |
| AR40 | 51.4 | 38.6 | 3 | 6 | — | — | — | — | — | — | — | 1% -Cr |
| AR41 | 51.4 | 38.6 | 3 | 6 | — | — | — | — | — | 1 | — | — |
| AR42 | 51.4 | 38.6 | 3 | 6 | — | — | — | — | — | — | — | 1% Pd |
| AR43 | 55 | 36 | 3 | 5 | — | 1 | — | — | — | — | — | — |
| AR44 | 55 | 36 | 3 | 4 | — | 2 | — | — | — | — | — | — |
| AR45 | 55 | 35 | 3 | 4 | — | 2 | — | — | — | — | 1 | — |
| AR46 | 61 | 29 | 2 | 4.5 | 1.5 | 1 | — | — | — | — | 1 | — |
| AR47 | 61 | 28 | 2 | 4.5 | 1.5 | 2 | — | — | — | — | 1 | — |
| AR48 | 51.5 | 35 | 6 | 4 | 3.5 | — | — | — | — | — | — | — |
| AR49 | 51.5 | 34 | 6 | 4 | 3.5 | — | — | — | — | — | 1 | — |
| AR50 | 51.5 | 32 | 6 | 4 | 3.5 | 1 | — | 1 | — | — | 1 | — |
| AR51 | 50 | 38.5 | 6 | 4 | 1.5 | — | — | — | — | — | — | — |
| AR52 | 48.5 | 40 | 6 | 4 | 1.5 | — | — | — | — | — | — | — |
| AR53 | 43.4 | 43.9 | 3 | 6 | 2 | — | — | — | — | — | — | Si—Cr—V |
| AR54 | 51.5 | 37 | 6 | 4 | 1.5 | 1 | — | — | — | — | 1 | — |
| AR55 | 61 | 27 | 2 | 4.5 | 1.5 | 1 | — | — | — | 2 | 1 | — |
| AR56 | 61 | 27 | 2 | 4.5 | 1.5 | 1 | — | — | — | — | 1 | 2% -Sr |
| AR57 | 61 | 27 | 2 | 4.5 | 1.5 | 1 | — | — | — | — | 1 | 2% -MM |
| AR58 | 61 | 27 | 2 | 4.5 | 1.5 | 1 | — | — | 2 | — | 1 | — |
| AR59 | 61 | 27 | 2 | 4.5 | 1.5 | 1 | 2 | — | — | — | 1 | — |
| AR60 | 61 | 27 | 2 | 4.5 | 1.5 | 1 | — | 2 | — | — | 1 | — |
| AR61 | 48.5 | 37 | 9 | 4 | 1.5 | — | — | — | — | — | — | — |
| AR62 | 46.5 | 42 | 6 | 4 | 1.5 | — | — | — | — | — | — | — |
| AR63 | 44.5 | 44 | 6 | 4 | 1.5 | — | — | — | — | — | — | — |
| AR64 | 48.5 | 38.5 | 6 | 4 | 3 | — | — | — | — | — | — | — |
| AR65 | 48.5 | 36.5 | 6 | 4 | 3 | 1 | — | — | — | — | 1 | — |
| AR66 | 48.5 | 38 | 6 | 4 | 1.5 | — | — | — | — | — | — | 2% -V |
| AR67 | 59 | 27 | 2 | 4.5 | 1.5 | 1 | — | — | — | 4 | 1 | — |
| AR68 | 60 | 27 | 2 | 4.5 | 1.5 | 1 | — | — | 1 | 2 | 1 | — |
| AR69 | 59 | 27 | 2 | 4.5 | 1.5 | 1 | — | — | 2 | 2 | 1 | — |
| AR70 | 58 | 27 | 2 | 4.5 | 1.5 | 1 | — | — | 3 | 2 | 1 | — |
| AR71 | 48.5 | 38 | 6 | 4 | 1.5 | — | — | — | — | 2 | — | — |
| AR72 | 48.5 | 40 | 4 | 4 | 1.5 | — | — | — | — | 2 | — | — |
| AR73 | 48.5 | 40 | 4 | 4 | 1.5 | — | — | — | 2 | — | — | — |
| AR74 | 48.5 | 37 | 4 | 4 | 1.5 | — | — | — | 2 | 2 | 1 | — |

TABLE II

| Base Alloy # | Without heptane/graphite grinding aids | With heptane/graphite grinding aids |
|---|---|---|
| AR003 | 0.18% | 0.34% |
| AR026 | 0.27% | 0.49% |
| AR031 | 1.79% | 2.81% |

TABLE III

| | Without glovebox protection | With glovebox proctection |
|---|---|---|
| Surface reaction time constant | 7 minutes | 1 minute |
| Bulk Diffusion time constant | 5.5 minutes | 2.5 minutes |

We claim:

1. A hydrogen storage alloy comprising:
an Mg—Ni based alloy;
said alloy having a two-phase microstructure comprising both a Mg-rich phase and a Ni-rich phase;
said microstructure further comprising micro-tubes having an inner core of Ni-rich material surrounded by a sheathing of Mg-rich material.

2. The hydrogen storage alloy of claim 1, wherein said two phase microstructure comprises amorphous structural regions and microcrystalline structural regions.

3. The hydrogen storage alloy of claim 1, wherein said Mg—Ni based alloy has a magnesium content ranging from 40 to 65 atomic percent of the alloy.

4. The hydrogen storage alloy of claim 3, wherein said Mg—Ni based alloy has a magnesium content ranging from 45 to 65 atomic percent of the alloy.

5. The hydrogen storage alloy of claim 1, wherein said Mg—Ni based alloy has a nickel content ranging from 25 to 45 atomic percent of the alloy.

6. The hydrogen storage alloy of claim 5, wherein said Mg—Ni based alloy has a nickel content ranging from 30 to 40 atomic percent of the alloy.

7. The hydrogen storage alloy of claim 1, wherein said Mg—Ni based alloy further contains manganese and cobalt.

8. The hydrogen storage alloy of claim 7, wherein said Mg—Ni based alloy has a cobalt content of between 1 and 10 atomic percent of the alloy.

9. The hydrogen storage alloy of claim 8, wherein said Mg—Ni based alloy has a cobalt content of between 2 and 6 atomic percent of the alloy.

10. The hydrogen storage alloy of claim 7, wherein said Mg—Ni based alloy has a manganese content of between 1 and 10 atomic percent of the alloy.

11. The hydrogen storage alloy of claim 10, wherein said Mg—Ni based alloy has a manganese content of between 3 and 8 atomic percent of the alloy.

12. The hydrogen storage alloy of claim 7, wherein said Mg—Ni based alloy further contains at least one element selected from the group consisting of Fe, Al, Zr, Zn, Cu, Ag, Cu, B, La, Ru, Re, Li, Cr, Pd, Si, V, Sr, Misch Metal, and mixtures thereof.

13. The hydrogen storage alloy of claim 12, wherein said at least one element is incorporated into the alloy in a total amount of less than about 5 atomic percent of the alloy and each individual element is incorporated into said alloy in an amount of less than about 3 atomic percent.

14. The hydrogen storage alloy of claim 1, wherein said microstructure is prepared by a process comprising the steps of:
forming a melt of the alloy;
melt quenching said melt onto a chill roller to form melt-quenched alloy ribbons, wherein the parameters of said melt-quenching are controlled such that said melt-quenched alloy ribbons have a two phase microsrturcture comprising a Mg-rich phase and a Ni-rich phase;
grinding said melt-quenched ribbons in an attritor to for a time sufficient to obtain a hydrogen storage alloy comprising the following:
1) a powder formed from said melt-quenched ribbons;
2) micro-tubes; and
3) a mixture of amorphous structural regions and microcrystalline regions.

* * * * *